(12) United States Patent
Horiuchi et al.

(10) Patent No.: US 11,937,259 B2
(45) Date of Patent: Mar. 19, 2024

(54) BASE STATION, TERMINAL, TRANSMISSION METHOD AND RECEPTION METHOD

(71) Applicant: Panasonic Intellectual Property Corporation of America, Torrance, CA (US)

(72) Inventors: Ayako Horiuchi, Kanagawa (JP); Tetsuya Yamamoto, Kanagawa (JP); Tomoya Nunome, Ishikawa (JP); Ankit Bhamri, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 385 days.

(21) Appl. No.: 17/421,343

(22) PCT Filed: Sep. 24, 2019

(86) PCT No.: PCT/JP2019/037363
§ 371 (c)(1),
(2) Date: Jul. 7, 2021

(87) PCT Pub. No.: WO2020/144899
PCT Pub. Date: Jul. 16, 2020

(65) Prior Publication Data
US 2021/0400646 A1    Dec. 23, 2021

(30) Foreign Application Priority Data

Jan. 9, 2019   (JP) .................... 2019-002051

(51) Int. Cl.
*H04W 72/23* (2023.01)
*H04L 1/08* (2006.01)
(Continued)

(52) U.S. Cl.
CPC .............. *H04W 72/23* (2023.01); *H04L 1/08* (2013.01); *H04L 5/0053* (2013.01);
(Continued)

(58) Field of Classification Search
CPC . H04W 72/23; H04W 28/04; H04W 72/0446; H04L 1/08; H04L 5/0053;
(Continued)

(56) References Cited

U.S. PATENT DOCUMENTS 9,113,392 B2 * 8/2015 Ueda .................... H04L 41/0816
11,419,142 B2 * 8/2022 Tie .......................... H04W 8/08
(Continued)

OTHER PUBLICATIONS

Motorola Mobility, "Corrections to HRLLC in 36.213, s06-s07," R1-1810043, Agenda Item: 7.2.4.6, 3GPP TSG RAN WG1 Meeting #94, Gothenburg, Sweden, Aug. 20-24, 2018, 24 pages.
(Continued)

*Primary Examiner* — Mohamed A Kamara
(74) *Attorney, Agent, or Firm* — Seed IP Law Group LLP

(57) ABSTRACT

Provided is a base station capable of enhancing signal reception performance. In the base station (100), a control unit (101) generates data signals in unit of fixed length. A transmission unit (107) performs repetitive transmission of a transmission signal including at least one of the data signals in unit of fixed length in a resource that can be set to a plurality of data lengths.

9 Claims, 15 Drawing Sheets

(51) Int. Cl.
*H04L 5/00* (2006.01)
*H04W 28/04* (2009.01)
*H04W 72/0446* (2023.01)

(52) U.S. Cl.
CPC .......... *H04L 5/0091* (2013.01); *H04W 28/04* (2013.01); *H04W 72/0446* (2013.01)

(58) Field of Classification Search
CPC ... H04L 5/0091; H04L 1/1819; H04L 1/1861; H04L 1/189
See application file for complete search history.

(56) References Cited

U.S. PATENT DOCUMENTS

| | | | |
|---|---|---|---|
| 2016/0242150 | A1 | 8/2016 | Kang et al. |
| 2019/0288811 | A1* | 9/2019 | Chang .................. H04W 72/23 |
| 2021/0219329 | A1* | 7/2021 | Zhou ....................... H04L 1/189 |
| 2021/0385848 | A1* | 12/2021 | Hwang ................ H04W 72/23 |
| 2023/0262779 | A1* | 8/2023 | Stern-Berkowitz ......................... H04L 1/1854 370/328 |

OTHER PUBLICATIONS

Ericsson, "RAN1 decisions for WI Ultra Reliable Low Latency Communication for LTE (LTE_HRLLC)—per topic," R1-1807583, Agenda Item: 6.2.7, 3GPP TSG RAN WG1 Meeting #93, Busan, South Korea, May 21-25, 2018. 12 pages.

Ericsson, "Summary of WI Ultra Reliable Low Latency Communication for LTE," RP-180693, Agenda Item: 10.3.3, 3GPP TSG RAN meeting #80, La Jolla, USA, Jun. 11-14, 2018, 4 pages.

Huawei, "Summary of 7.2.6.1.1 Potential enhancements to PDCCH," R1-1814178, Agenda Item: 7.2.6.1.1, 3GPP TSG RAN WG1 Meeting #95, Spokane, USA, Nov. 12-16, 2018, 28 pages.

Huawei, HiSilicon, "LTE Uu support for advanced V2X use cases," R1-1810142, Agenda Item: 7.2.4.6, 3GPP TSG RAN WG1 Meeting #94bis, Chengdu, China, Oct. 8-12, 2018, 6 pages.

International Search Report, dated Dec. 10, 2019, for corresponding International Application No. PCT/JP2019/037363, 4 pages.

Motorola Mobility, "Corrections to HRLLC in 36.213, s06-s07," R1-1810043, Agenda Item: 7.2.4.6, 3GPP TSG RAN WG1 Meeting #93, Gothenburg, Sweden, Aug. 20-24, 2018, 24 pages.

ZTE, "Remaining issues on PDSCH repetition for LTE URLLC," R1-1806769, Agenda item: 6.2.8.1, 3GPP TSG RAN WGl Meeting #93, Busan, Korea, May 21-25, 2018. (3 pages).

MediaTek Inc., "Evaluations and enhancements of NR PDCCH for URLLC," R1-1812374, Agenda Item: 7.2.6.1.1, 3GPP TSG RAN WG1 Meeting #95, Spokane, USA, Nov. 12-16, 2018. (8 pages).

ZTE, "On PDCCH enhancements for URLLC," R1-1813905, Agenda item: 7.2.6.1.1, 3GPP TSG RAN WG1 Meeting #95, Spokane, USA, Nov. 12-16, 2018. (9 pages).

Panasonic, "PDCCH enhancements for NR URLLC," R1-1812899, Agenda Item: 7.2.6.1.1, 3GPP TSG RAN WG1 Meeting #95, Spokane, USA, Nov. 12-16, 2018. (4 pages).

Extended European Search Report, dated Feb. 11, 2022, for European Application No. 19908725.5-1205. (14 pages).

* cited by examiner

BASE STATION, TERMINAL, TRANSMISSION METHOD AND RECEPTION METHOD

TECHNICAL FIELD

The present disclosure relates to a base station, a terminal, a transmission method, and a reception method.

BACKGROUND ART

A communication system called the 5th generation mobile communication system (5G) has been studied. For 5G, studies have been conducted on flexibly providing functions for each use case that requires an increase in higher-speed communication traffic, an increase in the number of connected terminals, a high reliability, and/or a low latency. Typical services corresponding to such use cases include enhanced Mobile Broadband (eMBB), massive Machine Type Communications (mMTC), and Ultra Reliable and Low Latency Communications (URLLC). The 3rd Generation Partnership Project (3GPP), which is an international standards-developing organization, has been studying development of communication systems in terms of both enhancement of the Long Term Evolution (LTE) system and New Radio (NR).

CITATION LIST

Non-Patent Literature

NPL 1
R1-1814178, "Summary of 7.2.6.1.1 Potential enhancements to PDCCH," Huawei, November 2018

SUMMARY OF INVENTION

However, there is scope for further study on a signal transmission method for improving reception performance in NR.

One non-limiting and exemplary embodiment facilitates providing a base station, a terminal, a transmission method, and a reception method capable of improving signal reception performance.

A base station according to an exemplary embodiment of the present disclosure includes: circuitry, which, in operation, generates a data signal in units of a fixed length; and a transmitter, which in operation, performs repetitive transmission of a transmission signal in a resource configurable to a plurality of data lengths, the transmission signal including at least one of a plurality of the data signals in units of the fixed length.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, it is possible to improve signal reception performance.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the accompanying drawings.

In NR, a terminal (also referred to as a User Equipment (UE)) is configured with a control resource set (CORESET) as a control signal channel (e.g., Physical Downlink Control Channel (PDCCH)) region for transmitting, for example, Downlink Control Information (DCI). For example, the UE monitors (the monitoring is also referred to as blind decoding) a Search Space (SS) within the CORESET that includes a PDCCH candidate position, so as to detect the DCI.

For example, URLLC requires ultra reliability and low latency. To that end, reduction in error rate of a data channel (e.g., Physical Downlink Shared Channel (PDSCH)) for transmitting a downlink data signal is required. Further, in order to reduce the error rate of the data channel, it is also required to reduce the error rate of the PDCCH. For example, when the terminal can correctly detect the PDCCH, the terminal can correctly recognize PDSCH allocation notified by the PDCCH. It is thus possible to reduce the error rate of the PDSCH.

[PDCCH Repetition]

Repetition has been considered as one of methods for reducing the error rate of the PDCCH (e.g., Non-Patent Literature (hereinafter referred to as "NPL") 1).

Figure 1:
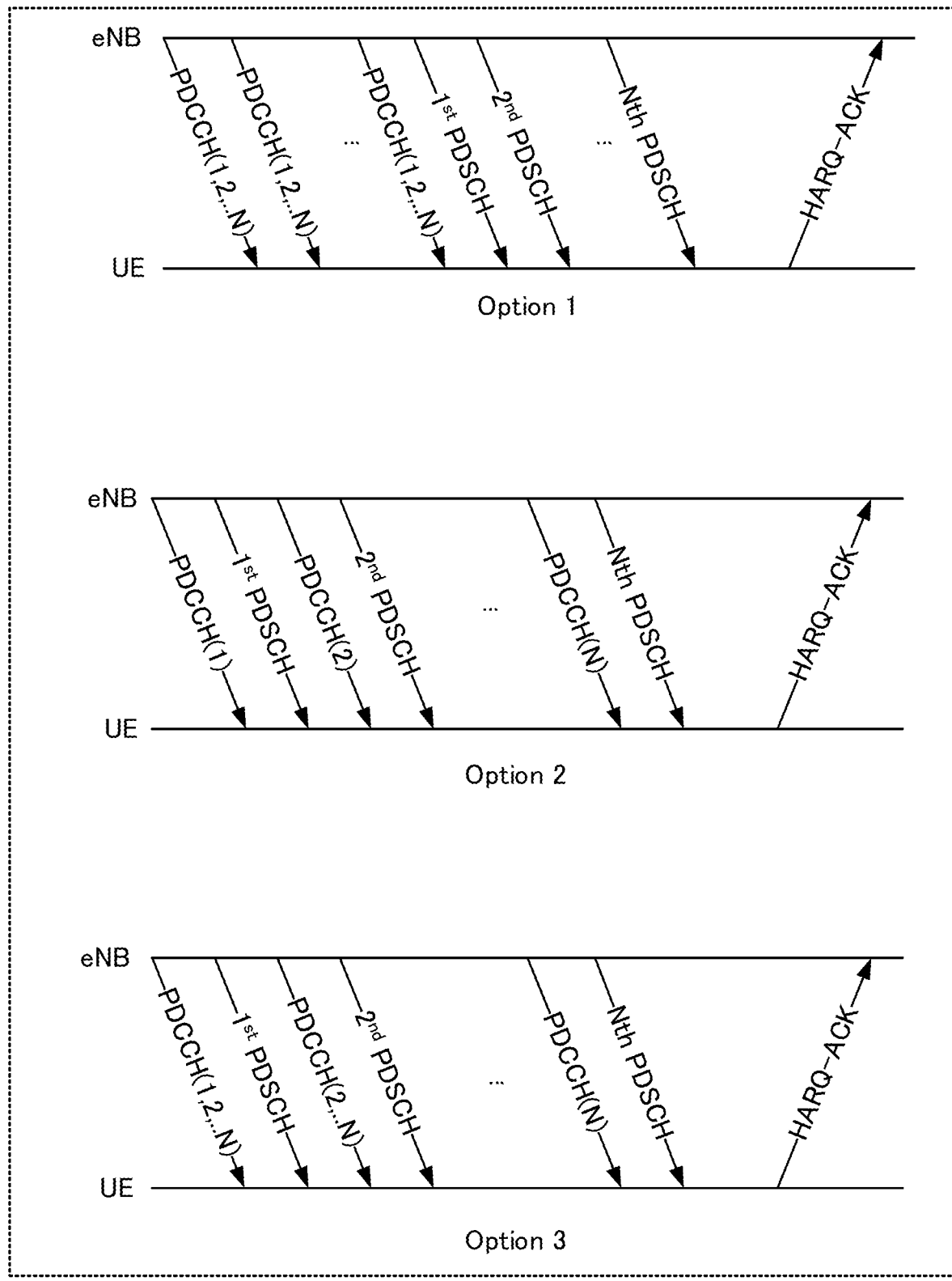
FIG. 1 illustrates exemplary PDCCH repetitions.

For example, as PDCCH repetition methods, three options (Options 1 to 3) as illustrated in FIG. 1 have been studied (see, e.g., NPL 1).

<Option 1>

In Option 1, the same PDSCH is allocated by a plurality of PDCCHs. DCI contents (contents notified to the terminal by DCI) transmitted using each of the PDCCHs are the same. In Option 1, a plurality of PDCCHs including the same DCI contents are transmitted from a base station (e.g., referred to as eNB or gNB) to the UE. Accordingly, diversity effects on the PDCCHs can be obtained, and it is possible for the terminal to increase PDCCH detection probability as compared with the probability of detecting a single PDCCH.

For example, in the example of Option 1 illustrated in FIG. 1, each of the PDCCHs includes the DCI contents indicating resource allocation of the first to the Nth PDSCHs. In other words, each of the PDCCHs notifies of resources for a plurality of PDSCHs. In addition, for example, the PDCCH includes the number of PDSCH repetitions (N times in FIG. 1). Based on, for example, the PDSCH starting position indicated in a detected PDCCH and the number of PDSCH repetitions, the terminal receives a plurality of PDSCHs assigned for the terminal.

In Option 1, the contents (e.g., DCI contents) of each of the PDCCH repetitions are the same. Thus, it is possible for the terminal to detect a plurality of PDCCHs after combining based on soft decision (Soft combining). Moreover, in Option 1, when the terminal successfully detects at least one of the PDCCHs, the terminal can receive all of the PDSCH repetitions (e.g., N PDSCHs in FIG. 1).

<Option 2>

In Option 2, PDCCHs and PDSCHs correspond to each other one-to-one. In other words, one PDSCH is allocated by one PDCCH as illustrated in FIG. 1. Thus, DCI contents transmitted using each of the PDCCHs differ between the PDCCHs, and the terminal cannot combine (e.g., Soft combining) a plurality of PDCCHs.

For example, in the case of repetition in Option 2, the plurality of PDCCHs allocate the PDSCHs in the same Hybrid Automatic Repeat Request (HARQ) process, respectively. Since the PDSCHs in the same HARQ process are allocated respectively by the plurality of PDCCHs having different DCI contents, diversity effects on the PDSCHs can be obtained, and it is possible for the terminal to improve PDSCH reception performance.

Here, 3GPP Release 15 (Rel. 15) NR requires that a PDSCH of the same HARQ process not be allocated until HARQ-ACK feedback is transmitted. However, in order to realize the PDCCH and PDSCH repetitions of Options 2 in a short time, the Rel-15 requirement needs to be eliminated.

Moreover, in Option 2, the terminal detects the PDCCHs independently without combining. Accordingly, when a certain PDCCH cannot be detected, the terminal cannot receive the PDSCH corresponding to the PDCCH. Thus, in Option 2, the terminal can receive the same number of PDSCHs as the PDCCHs the terminal has successfully detected.

Option 2 is more flexible in PDSCH allocation. For example, the base station can configure resources, MCSs, and the like for allocation of the respective PDSCHs individually using PDCCHs corresponding respectively to the PDSCHs.

<Option 3>

Option 3 is a method similar to a method employed for High Reliable and Low Latency Communication (HRLLC) in LTE corresponding to URLLC in NR, for example.

For example, in Option 3, the number of remaining PDSCH repetitions is notified by PDCCHs. In other words, in Option 3, the base station notifies the terminal of the number of PDSCH repetitions after each PDCCH transmission.

For example, when four repetitions are assumed (for example, N=4 in FIG. 1), the base station notifies the terminal of the number of repetitions=4 in the first PDCCH, the number of repetitions=3 in the second PDCCH, the number of repetitions=2 in the third PDCCH, and the number of repetitions=1 in the last fourth PDCCH.

In Option 3, when the terminal successfully receives a certain PDCCH, the number of PDSCH repetitions after reception of the PDCCH can be identified. Thus, the terminal can receive the subsequent PDSCHs even when the terminal cannot receive the subsequent PDCCHs.

However, in Option 3, since the number of remaining PDSCH repetitions is notified in each of the PDCCHs, the number of repetitions included in the DCI of each of the PDCCHs differs between the PDCCHs. In other words, the DCI contents included in the plurality of PDCCHs differ between the PDCCHs. Therefore, in Option 3, the PDCCHs cannot be combined in the terminal unlike Option 1, for example.

The examples of PDCCH repetition methods have been described above.

However, the association between PDCCH repetition and PDSCH allocation has not been comprehensively studied. For example, Options 1 to 3 illustrated in FIG. 1 are different repetition methods as described above, and the contents of PDCCH DCI in the respective options are different from one another. Therefore, the base station and the terminal cannot appropriately select a repetition method from among Options 1 to 3 for use, for example.

In this respect, an exemplary embodiment of the present disclosure will be described in relation to a method making it possible to switch between operations such as those of above-mentioned Options 1 to 3, for example, by the same signaling, to operate any of the options.

Embodiment 1

[Overview of Communication System]

A communication system according to the present embodiment includes base station 100 and terminal 200.

Figure 2:
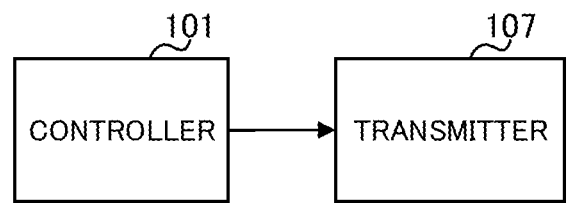
FIG. 2 is a block diagram illustrating an exemplary configuration of a part of a base station.

FIG. 2 is a block diagram illustrating an example of the configuration of a part of base station 100 according to the present embodiment. In base station 100 illustrated in FIG. 2, controller 101 (e.g., equivalent to the "circuitry") generates data signals (e.g., PDSCHs) in units of a fixed length (e.g., the number of repetition symbols to be described later). In resources (e.g., PDSCH resources) configurable to a plurality of data lengths, transmitter 107 (e.g., equivalent to the "transmitter") performs repetitive transmission of a transmission signal including at least one of the data signals in units of the fixed length.

Figure 3:
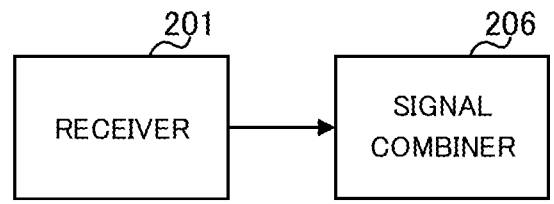
FIG. 3 is a block diagram illustrating an exemplary configuration of a part of a terminal.

FIG. 3 is a block diagram illustrating an exemplary configuration of a part of terminal 200 according to the present embodiment. In terminal 200 illustrated in FIG. 3, receiver 201 (e.g., equivalent to the "receiver") receives the transmission signal for which the repetitive transmission is performed in the resources (e.g., PDSCH resources) configurable to a plurality of data lengths. Note that, the transmission signal includes at least one data signal in units of the fixed length (for example, the number of repetition symbols). Signal combiner 206 (e.g., equivalent to the circuitry) combines the transmission signal to obtain the data signal.

[Configuration of Base Station]

Figure 4:
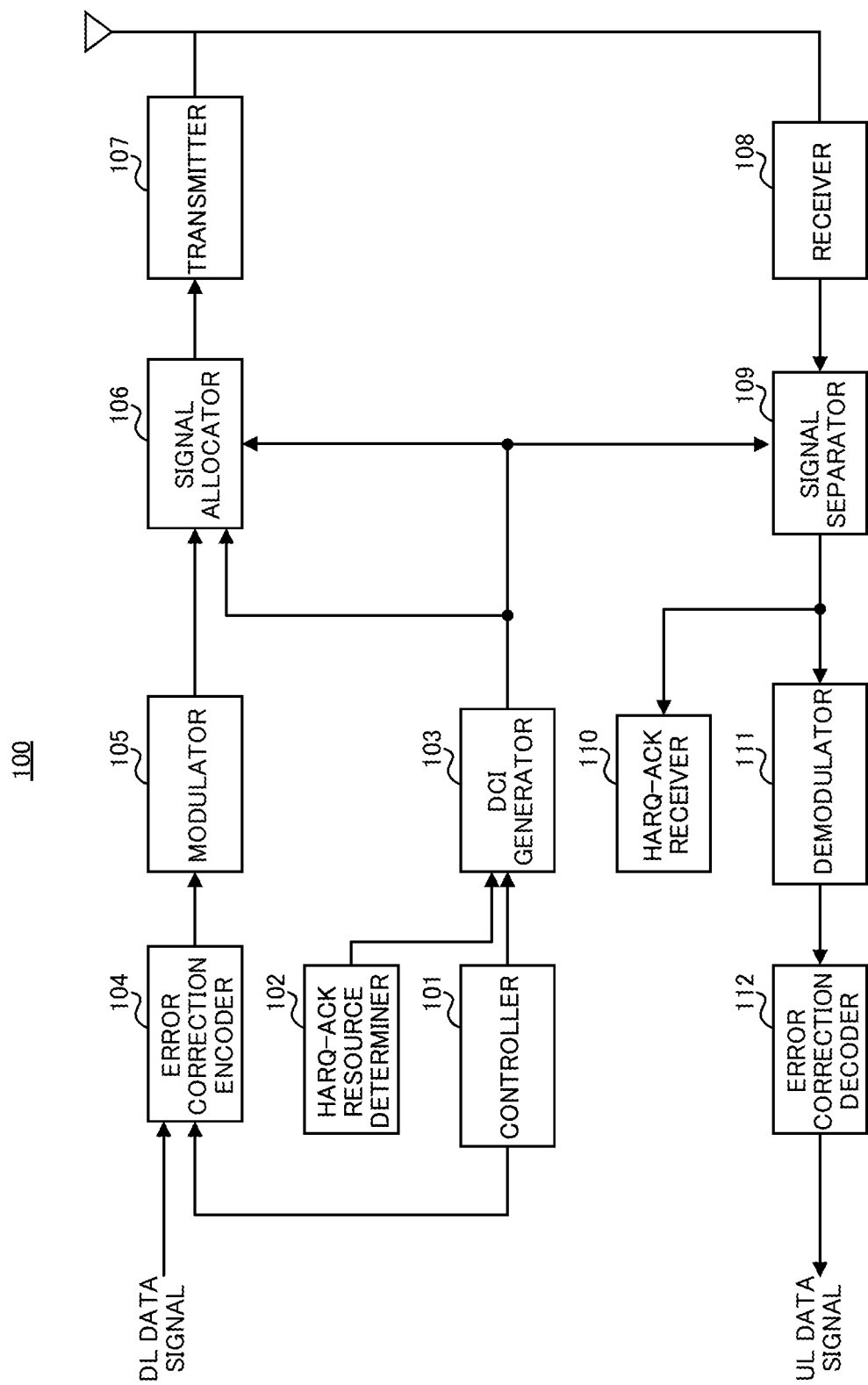
FIG. 4 is a block diagram illustrating an exemplary configuration of the base station.

FIG. 4 is a block diagram illustrating an exemplary configuration of base station 100 according to the present embodiment. In FIG. 4, base station 100 includes controller 101, HARQ-ACK resource determiner 102, DCI generator 103, error correction encoder 104, modulator 105, signal allocator 106, transmitter 107, receiver 108, signal separator 109, HARQ-ACK receiver 110, demodulator 111, and error correction decoder 112.

Controller 101 determines at least one repetition method for the PDCCH and the PDSCH.

For example, controller 101 determines the number of symbols for the PDSCH repetition. For example, controller 101 outputs, to error correction encoder 104, signaling of a higher layer (e.g., higher layer signaling; also referred to as Radio Resource Control (RRC) signaling) including information indicating the determined number of repetition symbols. The number of repetition symbols indicates, for example, the number of symbols that corresponds to a unit for repetition of the PDSCH (e.g., DL data signal).

Further, for example, controller 101 determines whether or not to configure the PDSCH repetition, or whether or not to configure the PDCCH repetition. When configuring the PDCCH repetition, controller 101 determines, for example, whether or not PDSCHs (in other words, time resources for PDSCHs) allocated by a plurality of PDCCHs overlap with one another.

In addition, when configuring the PDSCH repetition, controller 101 controls generation of data to be transmitted by repetition. For example, an Redundancy Version (RV) for transmission by repetition is determined from among a plurality of RVs corresponding to reading starting positions of a circular buffer (not illustrated) in which DL data signals are stored. Controller 101 outputs, to DCI generator 103, information on the repetition as determined.

HARQ-ACK resource determiner 102 determines a resource (e.g., referred to as a HARQ-ACK resource) to be used for transmitting a HARQ-ACK signal (also referred to as an ACK/NACK signal or a response signal) for the PDSCH (e.g., the DL data signal), and outputs HARQ-ACK resource information indicating the determined HARQ-ACK resource to DCI generator 103.

Based on information inputted from controller 101 and HARQ-ACK resource determiner 102, DCI generator 103 generates DCI, which is a control signal indicating allocation (e.g., DL allocation) of a downlink signal (e.g., DL data signal) and allocation (e.g., UL allocation) of an uplink signal (e.g., UL data signal or HARQ-ACK signal). DCI generator 103 outputs, to signal allocator 106, the DCI including the DL allocation information indicating the DL allocation or the UL allocation information indicating the UL allocation as transmission data. Further, DCI generator 103 outputs the DL allocation information as the control signal to signal allocator 106, and outputs the UL allocation information and HARQ-ACK resource information as the control signal to signal separator 109.

A transmission data signal (DL data signal), and, the higher layer signaling that is inputted from controller 101 are inputted to error correction encoder 104. Error correction encoder 104 performs error correction coding on the input signal, and outputs the encoded signal to modulator 105.

Modulator 105 performs modulation processing on the signal inputted from error correction encoder 104, and outputs the modulated data signal to signal allocator 106.

For example, based on the DL allocation information inputted from DCI generator 103, signal allocator 106 allocates, to a resource, the data signal (for example, the DL data signal or the higher layer signaling) inputted from modulator 105 or the DCI inputted from DCI generator 103. The formed transmission signal is outputted to transmitter 107.

Transmitter 107 performs radio transmission processing such as upconversion on the signal inputted from signal allocator 106, and transmits the signal to terminal 200 via an antenna.

Receiver 108 receives a signal transmitted from terminal 200 via the antenna, performs radio reception processing such as downconversion on the signal, and outputs the signal to signal separator 109.

Based on, for example, the UL allocation information and HARQ-ACK resource information inputted from DCI generator 103, signal separator 109 separates the signal inputted from receiver 108. Signal separator 109 outputs the separated data signal (e.g., UL data signal) to demodulator 111, and outputs the HARQ-ACK signal to HARQ-ACK receiver 110.

HARQ-ACK receiver 110 judges one of Acknowledgement (ACK), Negative Acknowledgement (HACK), and Discontinuous Transmission (DTX) with respect to the DL data signal by using the HARQ-ACK signal inputted from signal separator 109. HARQ-ACK receiver 110 reports a judgement result to, for example, a processor (not illustrated) of a Medium Access Control (MAC) layer.

Demodulator 111 performs demodulation processing on the signal inputted from signal separator 109, and outputs the obtained signal to error correction decoder 112.

Error correction decoder 112 decodes the signal inputted from demodulator 111 and obtains the reception data signal (UL data signal) from terminal 200.

[Configuration of Terminal]

Figure 5:
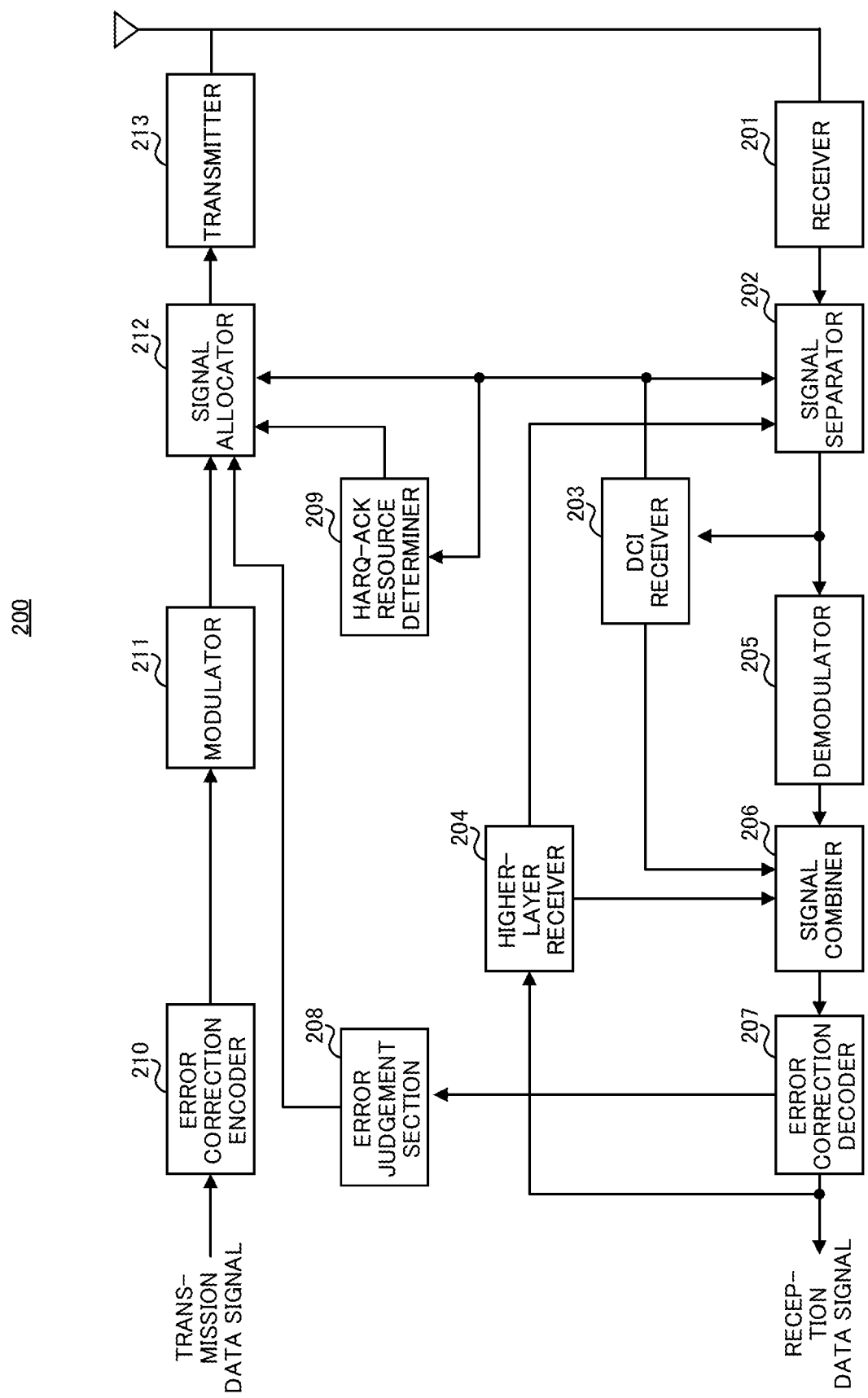
FIG. 5 is a block diagram illustrating an exemplary configuration of the terminal.

FIG. 5 is a block diagram illustrating an exemplary configuration of terminal 200 according to the present embodiment. In FIG. 5, terminal 200 includes receiver 201, signal separator 202, DCI receiver 203, higher-layer receiver 204, demodulator 205, signal combiner 206, error correction decoder 207, error judgement section 208, HARQ-ACK resource determiner 209, error correction encoder 210, modulator 211, signal allocator 212, and transmitter 213.

Receiver 201 receives a reception signal via an antenna, and outputs the reception signal to signal separator 202 after performing reception processing such as downconversion on the reception signal.

Signal separator 202 separates a signal component corresponding to a PDCCH candidate position (in other words, search space) from the signal inputted from receiver 201 and outputs the signal component to DCI receiver 203. Further, based on the DL allocation information inputted from DCI receiver 203, signal separator 202 separates the DL signal (for example, the DL data signal or the higher layer signaling) from the signal inputted from receiver 201 and outputs the DL signal to demodulator 205.

Note that, when the number of symbols for the DL data signal (in other words, PDSCH) is greater than the number of repetition symbols indicated by information inputted from higher-layer receiver 204, signal separator 202 generates the DL data signal of the number of repetition symbols, and outputs the generated DL data signal to demodulator 205.

DCI receiver 203 monitors the signal component (e.g., a component corresponding to the PDCCH position) inputted from signal separator 202, and detects DCI addressed to terminal 200. DCI receiver 203 decodes and receives the DCI detected by monitoring. DCI receiver 203 outputs DL allocation information in the decoded DCI to signal separator 202, outputs UL allocation information to signal allocator 212, outputs RV information indicative of an RV to signal combiner 206, and outputs HARQ-ACK resource information to HARQ-ACK resource determiner 209.

Higher-layer receiver 204 receives the higher layer signaling inputted from error correction decoder 207, and configures the number of PDSCH repetition symbols, for example. Higher-layer receiver 204 outputs information indicating the configured number of repetition symbols to signal separator 202 and signal combiner 206.

Demodulator 205 performs demodulation processing on the signal inputted from signal separator 202, and outputs the resulting demodulation signal to signal combiner 206.

Signal combiner 206 identifies the RV of the signal inputted from demodulator 205 based on the RV information inputted from DCI receiver 203 and the number of repetition symbols indicated in the information inputted from higher-layer receiver 204. Signal combiner 206 stores the signal inputted from demodulator 205 in the circular buffer (not illustrated) from the position of the identified RV, and combines signals of the same HARQ process. Signal combiner 206 outputs the stored signal to error correction decoder 207.

Error correction decoder 207 decodes the signal inputted from signal combiner 206, outputs the obtained higher layer signaling to higher-layer receiver 204, outputs the obtained reception data signal, and outputs the reception data signal to error judgement section 208.

Error judgement section 208 judges whether or not there is an error in the reception data using, for example, a Cyclic Redundancy Check (CRC) added to the reception data inputted from error correction decoder 207, and inputs the judgement result (e.g., ACK, NACK, or DTX) to signal allocator 212 as a HARQ-ACK signal.

HARQ-ACK resource determiner 209 determines a resource for transmitting the HARQ-ACK signal based on the HARQ-ACK resource information inputted from DCI receiver 203, and outputs information indicating the determined resource to signal allocator 212.

A transmission data signal (UL data signal) is inputted to error correction encoder 210, and error correction encoder 210 performs error correction coding on the transmission data signal, and outputs the encoded signal to modulator 211.

Modulator 211 modulates the signal inputted from error correction encoder 210 and outputs the modulation signal to signal allocator 212.

Signal allocator 212 identifies, based on the information inputted from DCI receiver 203 (e.g., UL allocation information), resources to which the UL data signal is to be allocated, and allocates the signal inputted from modulator 211 (e.g., UL data signal) to the identified resources to output the signal to transmitter 213. Further, signal allocator 212 allocates the HARQ-ACK signal inputted from error judgement section 208 to the resources based on the information inputted from HARQ-ACK resource determiner 209, and outputs the HARQ-ACK signal to transmitter 213.

Transmitter 213 performs radio transmission processing such as upconversion on the signal inputted from signal allocator 212, and transmits the signal.

[Operation of Base Station 100 and Terminal 200]

Next, the operation of base station 100 (see FIG. 4) and terminal 200 (see FIG. 5) will be described in detail.

Figure 6:
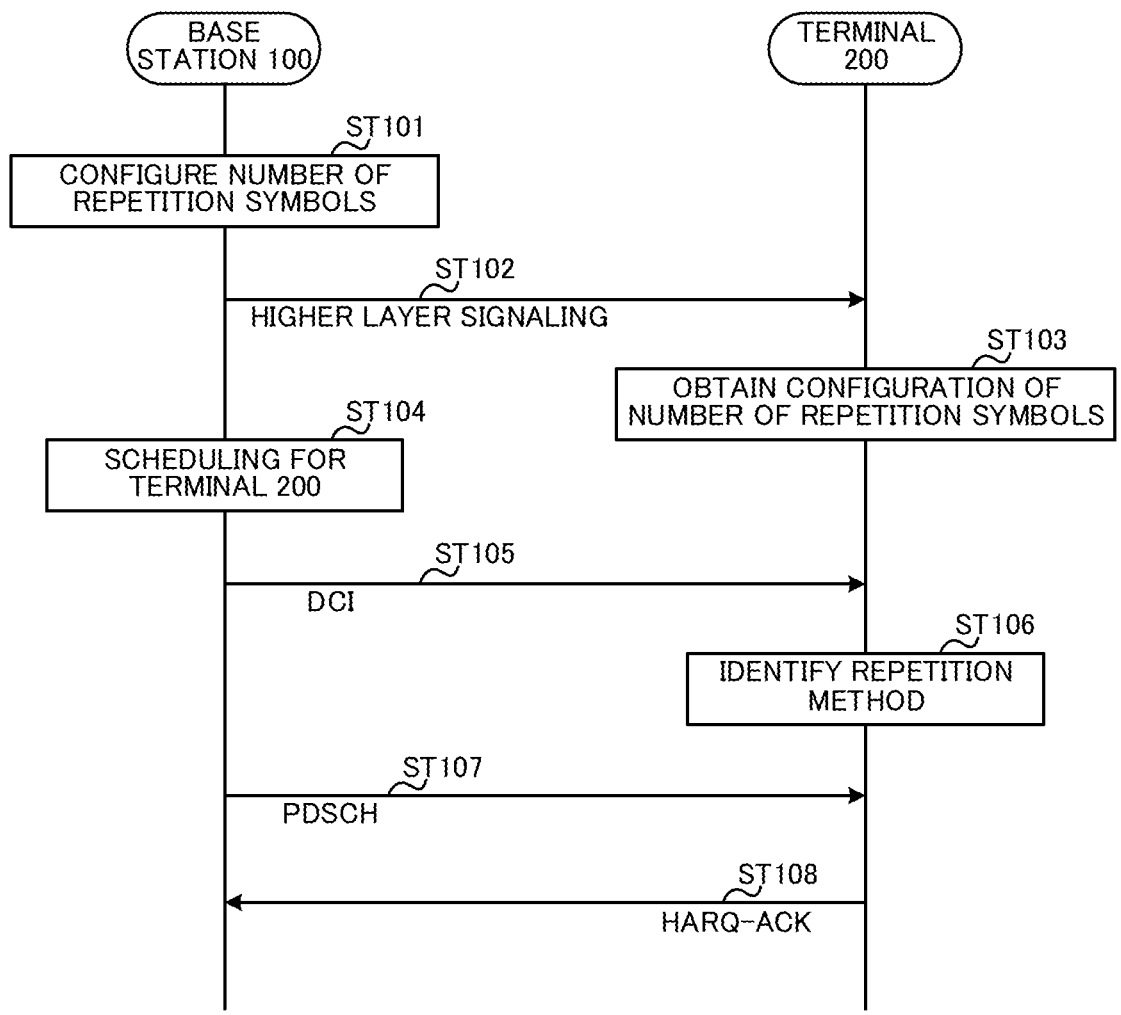
FIG. 6 is a sequence diagram illustrating an operation example of the base station and the terminal.

FIG. 6 is a sequence diagram illustrating exemplary processing of base station 100 and terminal 200.

In FIG. 6, base station 100 configures terminal 200 with the number of PDSCH repetition symbols (e.g., fixed number X) (ST101). Base station 100 notifies terminal 200 of higher layer signaling indicating the configuration of the number of PDSCH repetition symbols (ST102). Terminal 200 obtains the configuration of the number of PDSCH repetition symbols from the higher layer signaling notified by base station 100 (ST103).

Base station 100 performs scheduling for terminal 200 (ST104). For example, when configuring PDSCH repetition, base station 100 determines a resource (e.g., a frequency resource or a time resource) based on a repetition method to be applied. In addition, for example, base station 100 determines data (e.g., RV value) to be transmitted by the repetition using the number of PDSCH repetition symbols.

Base station 100 transmits the DCI including a scheduling result to terminal 200 (ST105). For example, base station 100 may transmit the DCI to terminal 200 using a plurality of PDCCHs (in other words, while applying the PDCCH repetition).

Terminal 200 identifies a PDSCH repetition method based on the configuration obtained at ST103 and the DCI transmitted at ST105 (ST106).

Base station 100 transmits a PDSCH signal (DL data signal) to terminal 200 (ST107). Terminal 200 transmits a HARQ-ACK signal corresponding to the received PDSCH signal to base station 100 (ST108).

Next, an exemplary PDSCH resource allocation in base station 100 and terminal 200 using a PDCCH will be described.

In NR, for example, resources in the time direction allocated for data are specified by a slot number for data allocation, a start symbol position in a slot, and a symbol length of allocated symbols (in other words, the number of consecutive symbols). These pieces of information may be specified, for example, by a DCI bit included in the PDCCH from among defined default configurations or combinations (in other words, candidates) configured by the higher layer signaling.

The start symbol position in the slot in which the data is allocated indicates, for example, the start position of one of a plurality of symbols (e.g., 14 symbols) in the slot at which the data is allocated. Therefore, in NR, the flexibility of the symbol length of the data is high, and the symbol length can be variably configured.

In the present embodiment, for example, when the PDSCH repetition is configured, the symbols that are PDSCH resources allocated by one or more PDCCHs are divided in units of specified number of symbols (e.g., the number of repetition symbols described above) and the PDSCH repetition is performed in units of divided symbols. In other words, base station 100 divides the PDSCH resources assigned for terminal 200 into resources for signals in units of the number of repetition symbols (e.g., signals in units of fixed length X), and transmits (in other words, performs repetitive transmission of) the PDSCH that is a transmission signal including at least one of the signals in units of the number of repetition symbols.

Note that the "PDSCH repetition" denotes an operation in which a plurality of PDSCHs of the same HARQ process are transmitted prior to transmission of a HARQ-ACK signal for the PDSCHs.

This operation allows terminal 200 to identify, for example, the operation of PDSCH repetitive transmission (e.g., the number of repetitions and the like) based on the configured number of repetition symbols and the data length of the allocated PDSCH, even when resources for a plurality of data lengths (or the number of symbols) are configurable for the PDSCH. Therefore, base station 100 can perform repetitive transmission of the PDSCH without notifying terminal 200 of the number of repetitions.

Operation examples 1 to 4 of base station 100 and terminal 200 according to the present embodiment will be described below.

[Operation Example 1]

Figure 7:
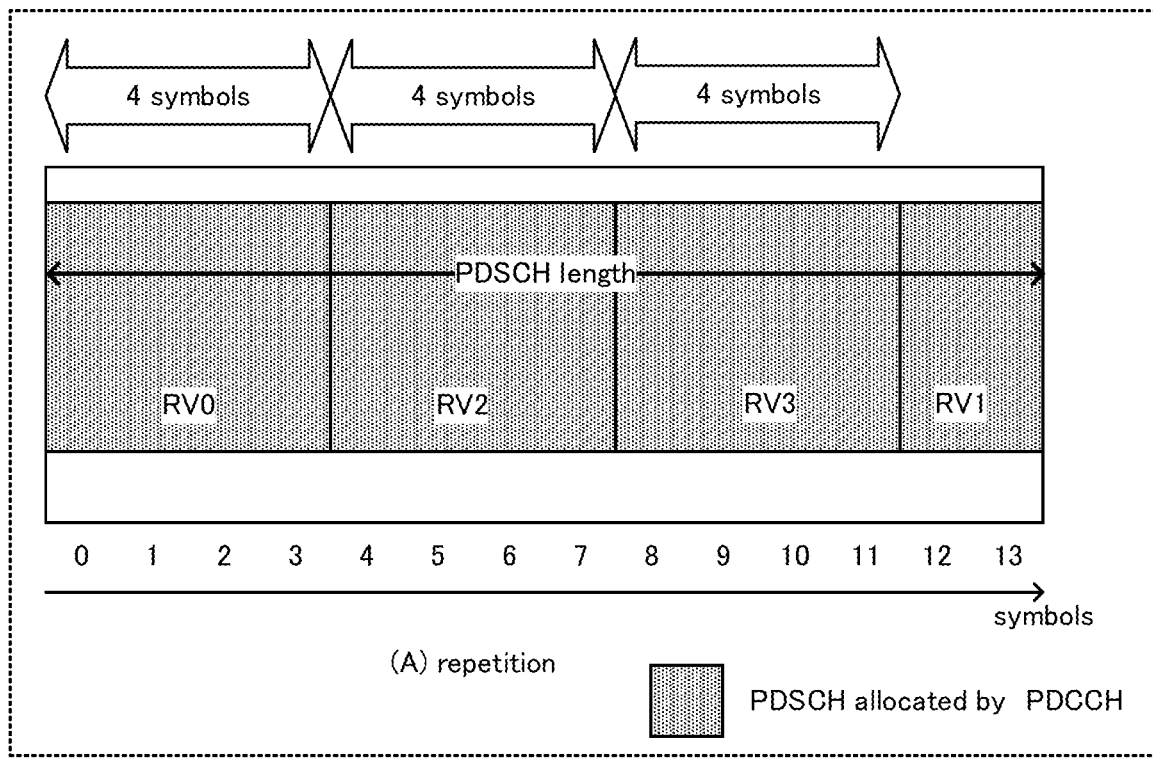
FIG. 7 illustrates an example of PDSCH allocation according to operation example 1.
Figure 8:
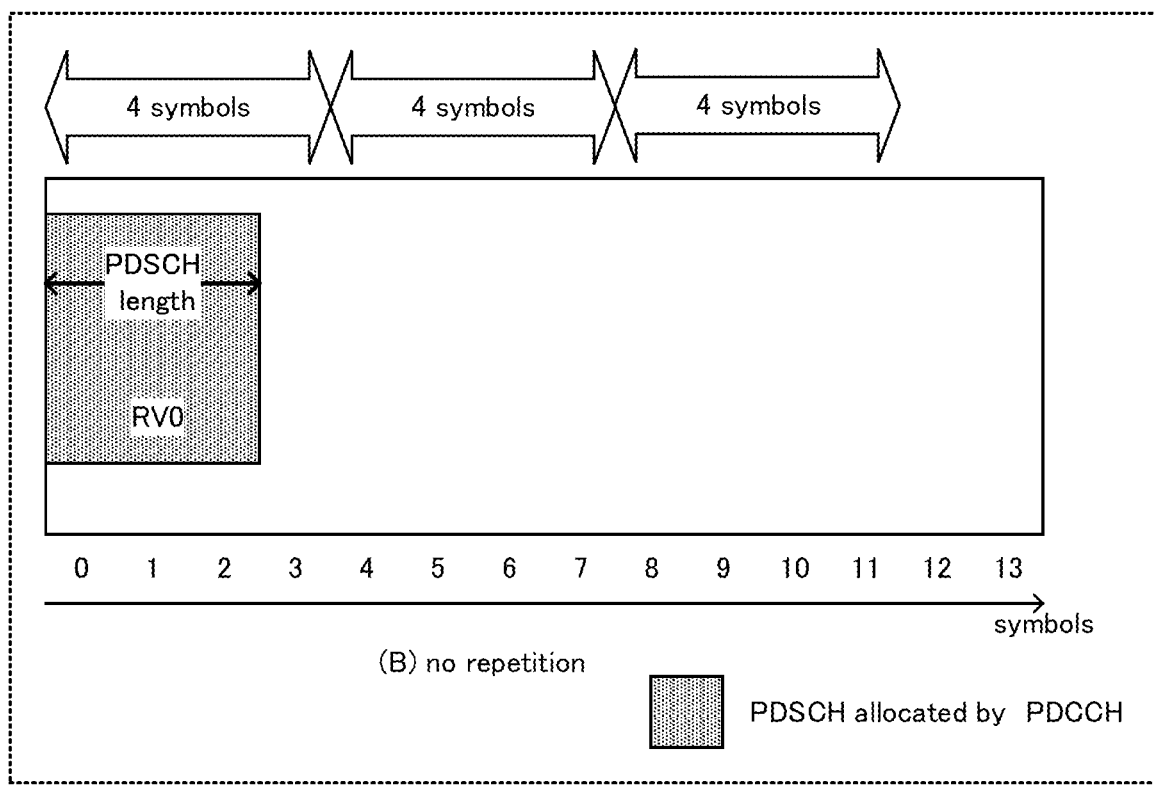
FIG. 8 illustrates an example of PDSCH allocation according to operation example 1.

FIGS. 7 and 8 illustrate examples of PDSCH allocation according to operation example 1.

Terminal 200 is notified of, for example, whether or not PDSCH repetition is configured, the number of repetition symbols (e.g., fixed length: X symbols), the cycle of the RV, and the like. These pieces of information are notified, for example, by the higher-layer RRC signaling, MAC signaling, or other signaling.

In FIGS. 7 and 8, the number of PDSCH repetition symbols is 4 symbols (e.g., X=4), and the cycle of the RV is [RV0, RV2, RV3, RV1]. In addition, FIG. 7 illustrates an example in which PDSCH repetition is configured, and FIG. 8 illustrates an example in which PDSCH repetition is not configured.

Further, in FIG. 7, the data length of PDSCH (referred to as "PDSCH length"; e.g., the number of symbols) is configured, for example, to 14 symbols. Note that, the data length of PDSCH is not limited to 14 symbols, and the data length may be variably set.

Accordingly, as illustrated in FIG. 7, the resources of 14 symbols to which the PDSCH is allocated are divided into 4 PDSCH resources, for example, of 4 symbols, 4 symbols, 4 symbols, and 2 symbols in units of 4 symbols that is the number of repetition symbols.

Base station 100 allocates and transmits the PDSCH of the same HARQ process in units of, for example, 4 symbols that is the number of repetition symbols. In other words, base station 100 transmits the PDSCH including at least one signal in units of 4 symbols. In FIG. 7, base station 100 transmits the PDSCH including 4 signals in units of 4 symbols (however, the last signal is 2 symbols).

In addition, in FIG. 7, base station 100 specifies RV0, RV2, RV3, and RV1 for respective 4 PDSCHs of 4 symbols, 4 symbols, 4 symbols, and 2 symbols. In other words, base station 100 resets the RV for each unit of 4 symbols in the 14-symbol PDSCH illustrated in FIG. 7.

Further, terminal 200 determines that the RV is switched (in other words, the RV shifts) from one RV another, for example, for each unit of 4 symbols that is the number of repetition symbols. For example, in FIG. 7, terminal 200 determines that the RVs specified for every four symbols are RV0, RV2, RV3, and RV1 in the 14-symbol PDSCH assigned for terminal 200. Thus, terminal 200 determines that the number of repetitions for the 14-symbol PDSCH assigned for terminal 200 is 4 times. Terminal 200 combines the received signals based on the identified RVs to obtain the PDSCH.

On the other hand, in FIG. 8, the data length of the PDSCH is set to 3 symbols, for example. As illustrated in FIG. 8, since a 3-symbol PDSCH is shorter than 4 symbols that is the number of repetition symbols (e.g., the unit for division), base station 100 does not perform repetition for the 3-symbol PDSCH, and transmits the 3-symbol PDSCH alone.

As described above, in operation example 1, base station 100 controls the operation in which the number of repetition symbols is configured for the PDSCH, the PDSCH repetition is configured when the symbol length of the PDSCH is longer than the number of repetition symbols, and the repetition is not configured when the symbol length of PDSCH is less than or equal to the number of repetition symbols.

Further, in operation example 1, the number of PDSCH repetitions is configured based on the PDSCH symbol length and the number of repetition symbols. This configuration allows terminal 200 to identify the number of PDSCH repetitions based on the number of repetition symbols without depending on the symbol length of the allocated PDSCH. Therefore, according to operation example 1, signaling for notification of the number of PDSCH repetitions from base station 100 to terminal 200 is not required.

<TBS Calculation Method>

Base station 100 may configure, for example, the same Transport block size (TBS) for repetitive PDSCHs. When the TBSs of a plurality of repetitive PDSCHs are the same, terminal 200 is capable of enhancing the reception quality by combining the repetitive PDSCHs.

For example, in calculation of the value of a TBS of a PDSCH in NR, the number "$N_{RE}$" of Resource elements (REs) used for the PDSCH is calculated by following Equations 1 and 2:

(Equation 1)
$$N'_{RE} = N_{sc}^{RB} \cdot N_{symb}^{sh} - N_{DMRS}^{PRB} - N_{oh}^{PRB} \quad [1]$$

(Equation 2)
$$N_{RE} = \min(156, N'_{RE}) \cdot n_{PRB}. \quad [2]$$

Here, "$N_{symb}^{sh}$" denotes the number of symbols, "$N_{oh}^{PRB}$" denotes the amount of overhead per resource block (e.g., Physical Resource Block (PRB)), and "$N_{DMRS}^{PRB}$" denotes the number of REs for e.g., a Demodulation Reference Signal (DMRS) per PRB. Note that $N_{oh}^{PRB}$ may be configured for terminal 200 by, for example, the higher layer signaling.

For example, in FIG. 7, the number of symbols for PDSCH is 14 symbols, but 4 symbols, which is the configured number of repetition symbols, are used for calculation of the TBS of the PDSCH. In this case, for example, the number of REs per 4 symbols may be configured for the values of $N_{oh}^{PRB}$ and $N_{DMRS}^{PRB}$. In other words, the same value may be used for the values of $N_{oh}^{PRB}$ and $N_{DMRS}^{PRB}$ such that results of calculation of TBS do not differ from one another at borders between the groups of 4 symbols resulting from division by the number of repetition symbols. Further, for example, $N_{oh}^{PRB}$ may be configured to 0 in order to be the same value.

In addition, regarding $N_{DMRS}^{PRB}$, the same number of REs may be configured for $N_{DMRS}^{PRB}$ for each of PDSCH repetitions in calculation of the TBS even when a DMRS of a different number of REs is actually transmitted in each of the PDSCH repetitions.

For example, in FIG. 7, the number of symbols of the last (fourth) PDSCH repetition is 2 symbols. However, also as for this 2 symbols, the TBS is calculated using 4 symbols in order to configure the same TBS between the last PDSCH repetition and the other (e.g., the first to third) PDSCH repetitions (the number of symbols: 4 symbols), and the values of $N_{oh}^{PRB}$ and $N_{DMRS}^{PRB}$ may also be configured the same as those in the case of 4 symbols.

Note that, the description with reference to FIG. 7 has been given in which, when the resources of 14 symbols to which the PDSCH is allocated are divided per 4 symbols that is the number of repetition symbols, the number of symbols for each PDSCH is 4 symbols or less (4 symbols or 2 symbols in FIG. 7). However, the method of dividing resources is not limited to this, and for example, when there is a PDSCH of less than 4 symbols, the PDSCH of less than 4 symbols may be integrated with the last one of the 4-symbol PDSCHs. For example, the resources of 14 symbols to which the PDSCH is allocated may be divided into three PDSCH resources of resources of a 4-symbol PDSCH, resources of a 4-symbol PDSCH, and resources of a 6-symbol PDSCH (in other words, resources of 4-symbol and 2-symbol PDSCHs integrated together). Note that, also when the PDSCH is 6 symbols, the calculation of the TBS may be based on 4 symbols that is the number of repetition symbols, similarly as described above.

Further, also in FIG. 8, the calculation of the TBS may be based on 4 symbols as in FIG. 7.

As described above, in operation example 1, the TBSs of the respective PDSCHs are calculated based on the number of repetition symbols (e.g., fixed length X). Thus, for example, the TBSs are calculated based on the same condition between the repetitive PDSCHs. Thus, terminal 200 can combine a plurality of repetitive PDSCHs.

[Operation Example 2]

While operation example 1 focuses on the PDSCH repetition, operation example 2 will be described in relation to a case where PDCCH repetition is also performed in addition to the PDSCH repetition.

Figure 9:
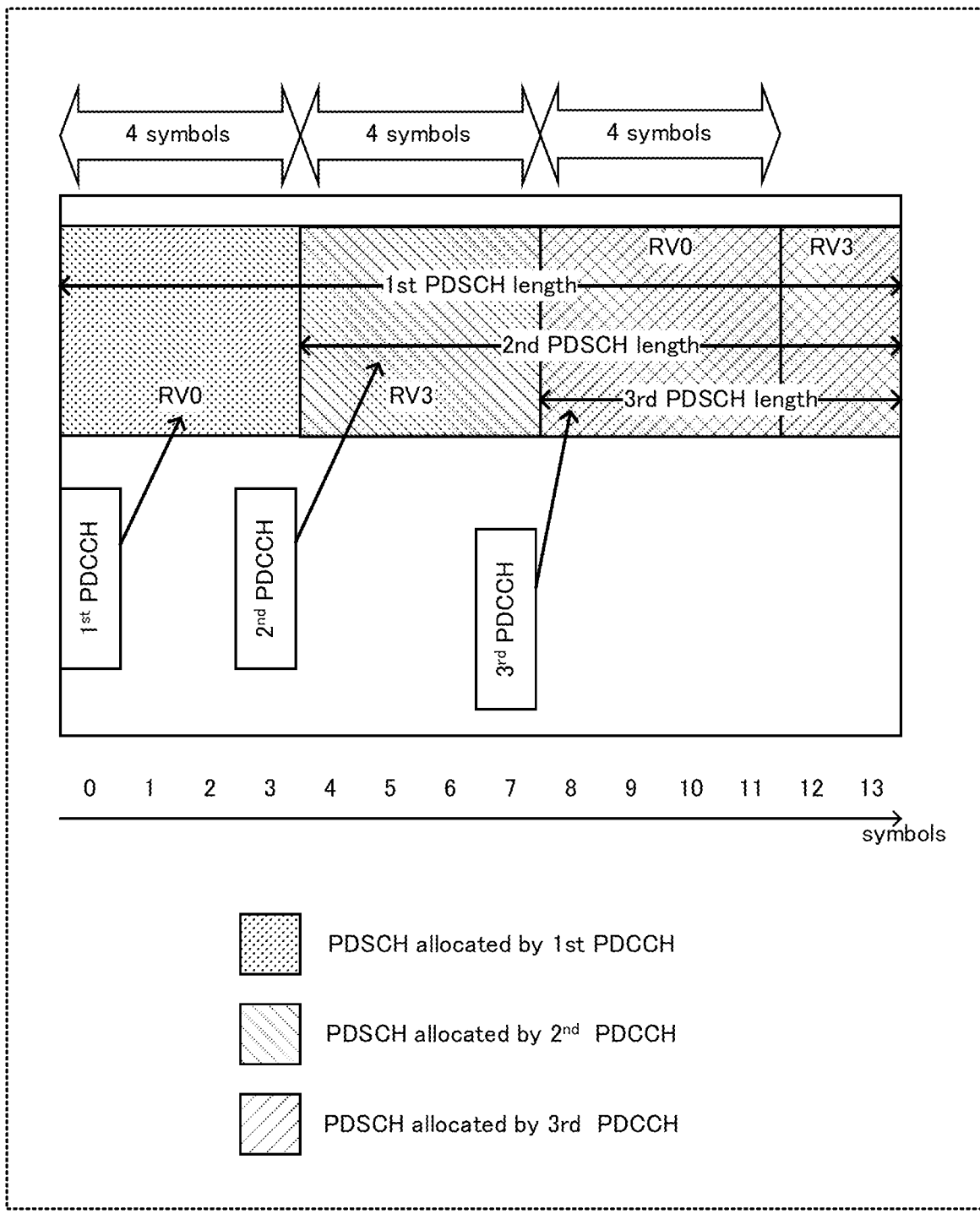
FIG. 9 illustrates an example of PDSCH allocation according to operation example 2.

FIG. 9 illustrate an example of PDSCH allocation according to operation example 2.

In operation example 2, base station 100 notifies PDSCH repetition by using a plurality of PDCCHs as illustrated in FIG. 9.

In FIG. 9, by way of example, the number of repetition symbols (e.g., fixed length X) is 4 symbols, and the cycle of the RV is [RV0, RV3, RV0, RV3]. In FIG. 9, for example, 14 symbols are configured as the data length (number of symbols) of PDSCH.

As illustrated in FIG. 9, the first PDCCH allocates the symbol length=14 from symbol #0 and specifies RV0. Further, as illustrated in FIG. 9, the second PDCCH allocates the symbol length=10 from symbol #4 and specifies RV3. The third PDCCH allocates the symbol length=6 from symbol #8 and specifies RV0.

Thus, in operation example 2, the PDSCH time resources allocated by the second and subsequent PDCCHs overlap with a portion of the PDSCH time resources allocated by the PDCCHs transmitted earlier (in other words, transmitted in front of) the respective PDCCHs. Further, as illustrated in FIG. 9, each of the starting positions (in other words, the start symbol positions) of the PDSCH time resources allocated by the second PDCCH and the third PDCCH is in rear of the start symbol position of the PDSCH allocated by the first PDCCH, by an integer multiple of the number of repetition symbols (4 symbols in FIG. 9).

Note that Rel-15 NR does not assume that the overlapping PDSCH resources are allocated by a plurality of PDCCHs. In Rel-15 NR, when such allocation is performed, the UE determines that PDCCHs have been erroneously detected, and discards the detected PDCCHs.

In operation example 2, base station 100 notifies terminal 200 of, for example, the same frequency resources, the same HARQ process number, a non-toggled New Data Indicator (NDI), and the same MCS using each of the PDCCHs. Further, as described above, base station 100 notifies terminal 200 of the PDSCH start symbol position at each integer multiple of the number of repetition symbols (4 symbols in FIG. 9), for example, using each of the PDCCHs.

For example, based on the resource information for these PDSCHs notified by the plurality of PDCCHs, terminal 200 judges whether or not repetition is configured for the PDSCHs allocated by the plurality of PDCCHs.

For example, in FIG. 9, when the first PDCCH is successfully detected, terminal 200 shifts the RV in the order of RV #0, RV #3, RV #0, RV #3 on the assumption of PDSCH repetitions for every four symbols as in operation example 1. In addition, for example, in FIG. 9, when the second and the third PDCCHs are further detected successfully, terminal 200 is notified of the same frequency and the same HARQ process by the three PDCCHs. Thus, terminal 200 is capable of determining that the repetition is configured for the PDSCHs allocated by the three PDCCHs.

Further, for example, in FIG. 9, when terminal 200 fails to detect the first PDCCH and successfully detects the second PDCCH, terminal 200 recognizes that the second PDCCH is the first received PDCCH. Accordingly, terminal 200 receives the PDSCH, assuming that PDSCH repetition starts at the start symbol position (symbol #4) of the PDSCH specified by the second PDCCH illustrated in FIG. 9. In addition, since RV #3 is specified by the second PDCCH, terminal 200 shifts the RV of the PDSCH in the order of RV #3, RV #0, RV #3. Further, for example, in FIG. 9, when the third PDCCH is also successfully detected, terminal 200 is notified of the same frequency and the same HARQ process by the two PDCCHs. Thus, terminal 200 is capable of determining that the repetition is configured for the PDSCHs allocated by the two PDCCHs.

Further, for example, in FIG. 9, when terminal 200 fails to detect the first and the second PDCCHs and successfully detects the third PDCCH, the third PDCCH is recognized to be the first received PDCCH. Accordingly, terminal 200 receives the PDSCH, assuming that PDSCH repetition starts at the start symbol position (symbol #8) of the PDSCH specified by the third PDCCH illustrated in FIG. 9. In addition, since RV #0 is specified by the third PDCCH, terminal 200 shifts the RV of the PDSCH in the order from RV #0 to RV #3.

As is understood, in operation example 2, even when detection of front PDCCHs of the plurality of PDCCHs is failed, when detection of the rear PDCCHs is succeeded, terminal 200 is capable of receiving the rear PDSCHs corresponding to the detected rear PDCCHs. In other words, in operation example 2, terminal 200 can perform the same operation as Option 3 illustrated in FIG. 1 without notification of the number of repetitions.

[Operation Example 3]

Figure 10:
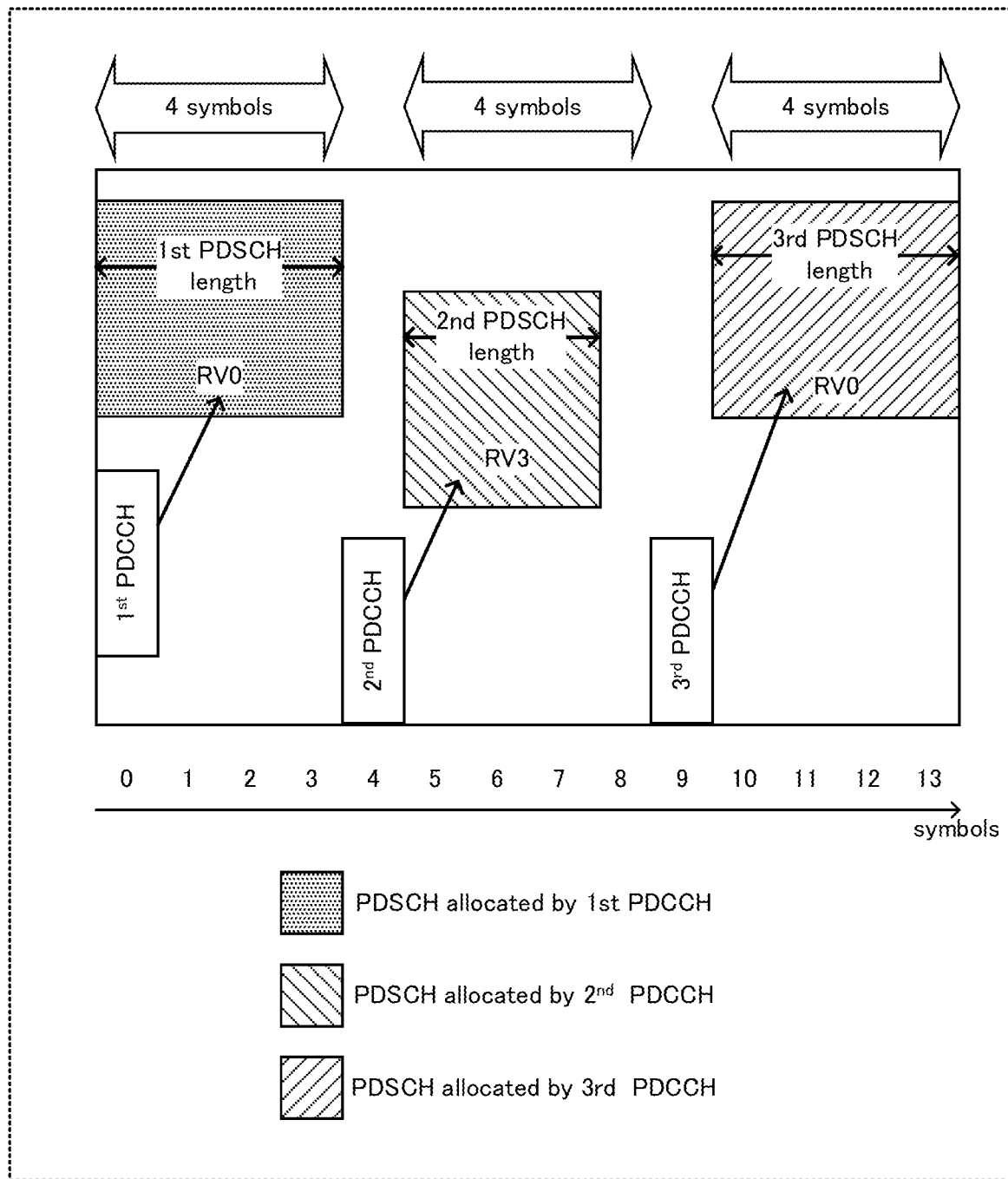
FIG. 10 illustrates an example of PDSCH allocation according to operation example 3.

FIG. 10 illustrates an example of PDSCH allocation according to operation example 3.

In operation example 3, as illustrated in FIG. 10, base station 100 notifies of PDSCH repetition by using a plurality of PDCCHs as in operation example 2.

In FIG. 10, by way of example, the number of repetition symbols (e.g., fixed length X) is 4 symbols, and the cycle of the RV is [RV0, RV3, RV0, RV3].

In operation example 3, base station 100 notifies terminal 200 of, for example, the same HARQ process number, and a non-toggled New Data Indicator (NDI) using each of PDCCHs. Base station 100 also notifies terminal 200 of, for example, different frequency resources in the respective PDCCHs. Base station 100 also notifies terminal 200 of different time resources (in other words, non-overlapping time resources) in the respective PDCCHs.

Thus, in operation example 3, base station 100 allocates different resources for PDSCHs respectively in the plurality of PDCCHs. For example, as illustrated in FIG. 10, the first PDCCH allocates the symbol length=4 from symbol #0 and specifies RV0. Further, as illustrated in FIG. 10, the second PDCCH allocates the symbol length=4 from symbol #5 and specifies RV3. The third PDCCH allocates the symbol length=4 from symbol #10 and specifies RV0. In other words, base station 100 generates a DL data signal in units of 4 symbols that is the number of repetition symbols, and performs repetitive transmission of a PDSCH including one signal in units of 4 symbols by using each of the PDCCHs.

When each of the PDCCHs is successfully detected, terminal 200 receives each PDSCH based on the notification in the detected PDCCH. Further, for example, in FIG. 10, when a plurality of PDCCHs are successfully detected, terminal 200 is notified of the same HARQ process by the plurality of PDCCHs. Thus, terminal 200 is capable of determining that the repetition is configured for the PDSCHs allocated by the plurality of PDCCHs.

As described above, in operation example 3, for example, as illustrated in FIG. 10, since the PDSCH resources can be allocated by the plurality of PDCCHs without overlap between the PDSCH resources, base station 100 may freely notify the RV per PDCCH. Further, in operation example 3, terminal 200 can receive the PDSCH corresponding to the detected PDCCH. In other words, in operation example 3, terminal 200 can perform the same operation as Option 2 illustrated in FIG. 1.

Note that, in operation example 3 as in operation example 1, even when the number of PDSCH symbols is less than 4 symbols that is the configured number of repetition symbols, the number of symbols used for calculating the TBS may be 4 symbols in order to make the TBSs the same between the PDSCHs allocated by the respective PDCCHs.

In addition, in operation example 3, frequency resources for the PDSCH allocated by each of the plurality of PDCCHs can be arranged at different positions, but in order to make the TBSs the same, it is preferable that the same number of frequency resources and the same MCS be configured for each of the PDSCHs. However, base station 100 may adjust the numbers of allocated frequency resources and the MCSs such that the TBS is the same between the PDSCHs.

[Operation Example 4]

Figure 11:
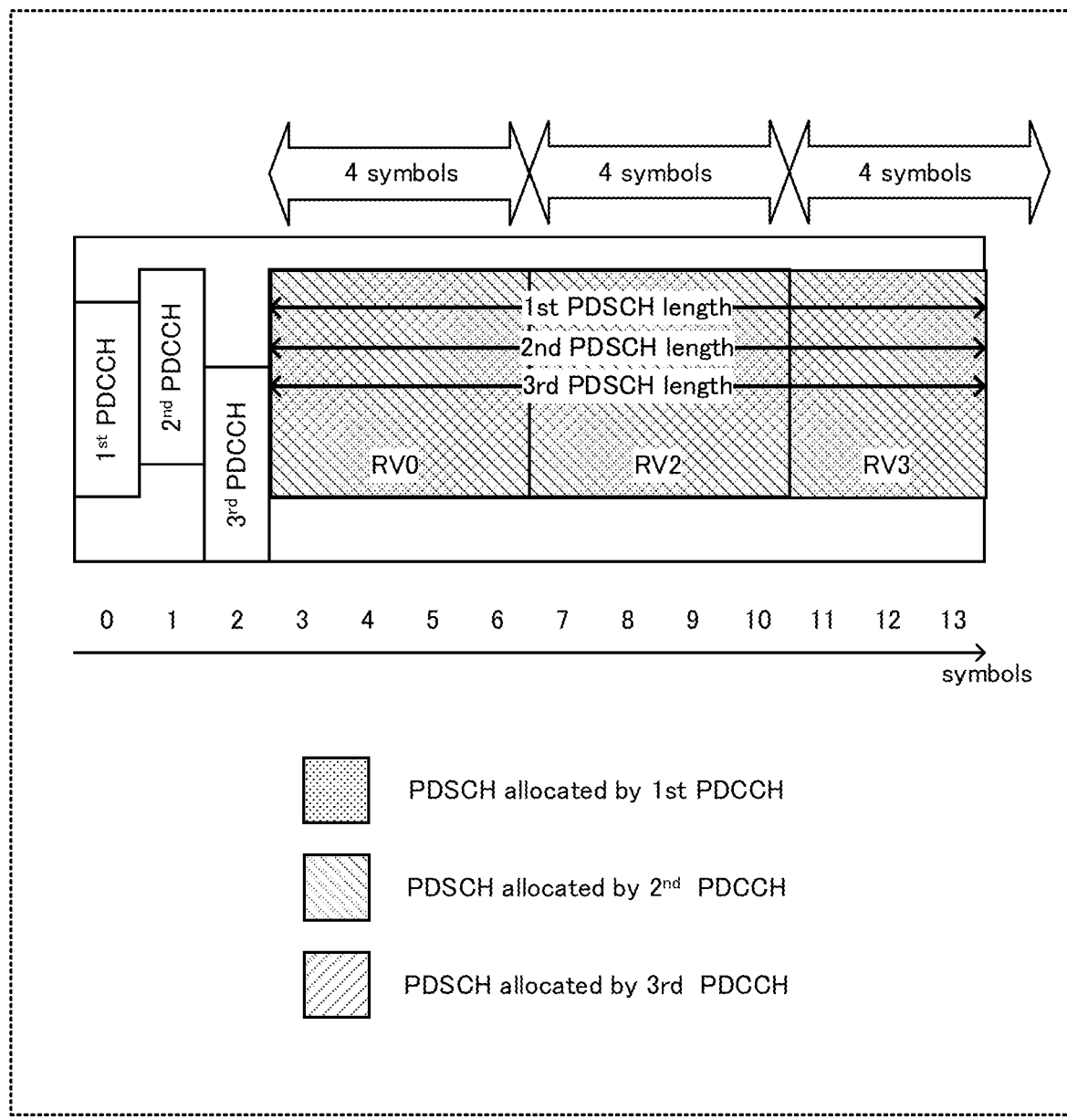
FIG. 11 illustrates an example of PDSCH allocation according to operation example 4.

FIG. 11 illustrates an example of PDSCH allocation according to operation example 4.

In operation example 4, as illustrated in FIG. 11, base station 100 notifies of PDSCH repetition by using a plurality of PDCCHs as in operation example 2.

In FIG. 11, by way of example, the number of repetition symbols (e.g., fixed length X) is 4 symbols, and the cycle of the RV is [RV0, RV2, RV3, RV1].

In operation example 4, base station 100 notifies terminal 200 of, for example, PDSCHs of the same frequency resources and the same time resources using the respective PDCCHs. Base station 100 also notifies the same HARQ process number and a non-toggled New data indicator (NDI) in the PDCCHs. In other words, the plurality of PDCCHs notified from base station 100 to terminal 200 in operation example 4 include the same DCI contents.

Further, for example, in FIG. 11, when a plurality of PDCCHs are successfully detected, terminal 200 is notified of the same HARQ process by the plurality of PDCCHs. Thus, terminal 200 is capable of determining that the repetition is configured for the PDSCHs allocated by the plurality of PDCCHs.

As is understood, in operation example 4, using the PDCCHs, base station 100 notifies of the PDSCH resources of the same content between all the PDCCHs. In operation example 4, for example, in FIG. 11, terminal 200 is capable of receiving all the PDSCHs assigned for terminal 200 when terminal 200 successfully detects at least one PDCCH of the three PDCCHs. In other words, in operation example 4, terminal 200 can perform the same operation as Option 1 illustrated in FIG. 1.

Operation examples 1 to 4 have been described above.

For example, without additional content to the DCI contents notified by the PDCCHs, base station 100 is capable of flexibly switching between operation examples 1 to 4 depending on the resources for PDSCHs to be allocated by the PDCCHs (e.g., the start position, and/or the symbol length) and the number of PDCCHs to be transmitted.

In other words, base station 100 can operate any of operation examples 1 to 4 (for example, the same operations as Options 1 to 3 in FIG. 1) while switching between the operation examples based on the notification of the same HARQ process number (and a non-toggled NDI) and additionally based on the configuration in resource allocation information (in other words, the DCI contents notified by each of the PDCCHs). That is, base station 100 is capable of controlling the repetition based on association between the PDCCH repetition (e.g., any of Options 1 to 3 in FIG. 1) and PDSCH allocation.

For example, base station 100 is capable of applying the same operation as Option 1 illustrated in FIG. 1 by notification of the same frequency resources and the same time resources as described in operation example 4 (for example, see FIG. 11). Further, for example, base station 100 is capable of applying the same operation as Option 2 illustrated in FIG. 1 by notification of different resources as described in operation example 3 (for example, see FIG. 13). Moreover, for example, base station 100 is capable of applying the same operation as Option 3 illustrated in FIG. 1 by notification of the same frequency resources and different time resources (for example, the start symbol positions and/or the like) as described in operation example 2 (for example, see FIG. 12).

For example, base station 100 may select any operation of operation examples 1 to 4 in consideration of the quality between base station 100 and terminal 200, the amount of resources allocated for other terminals 200, other signals to be transmitted, or the like.

As described above, in the present embodiment, base station 100 divides PDSCH resources configurable to a plurality of data lengths into resources of the number of repetition symbols (for example, in units of the fixed length), and performs repetitive transmission (in other words, PDSCH repetition) of a transmission signal including at least one signal in units of the aforementioned number of repetition symbols among the PDSCH resources allocated by PDCCHs. In other words, base station 100 generates a DL data signal in units of the number of repetition symbols, allocates the DL data signal to variably configured PDSCH resources, and transmits the DL data signal.

In addition, terminal 200 receives PDSCHs (e.g., a signal including at least one data signal having a unit length of the number of repetition symbols) for which base station 100 performs repetitive transmission, in PDSCH resources configurable to a plurality of data lengths, and combines the received PDSCHs to obtain a DL data signal.

As is understood, since PDSCH repetition is performed in units of the repetition symbols, base station 100 is capable of switching between the PDSCH repetition methods by the same signaling to terminal 200 (in other words, without adding signaling) as described above.

Thus, base station 100 is capable of, for example, configuring the PDSCH repetition suitable for terminal 200 and transmitting the PDSCHs. Therefore, according to the present embodiment, it is possible to enhance the PDSCH reception performance.

Note that, the present embodiment has been described in which the number of PDSCH repetition symbols is signaled via the higher layer, but the number of PDSCH repetition symbols may be a predetermined fixed value or a value determined from another parameter (in other words, a value implicitly notified).

Further, instead of the number of PDSCH repetition symbols, a symbol position at which repetition is switched (in other words, a symbol position at which a RV is reset) may be notified, or may be predetermined.

Embodiment 2

Embodiment 1 has been described in which the number of PDSCH repetition symbols is notified by the higher layer signaling. Instead, in the present embodiment, the number of PDSCH repetition symbols is determined based on a CORESET monitoring symbol for detection of a PDCCH (in other words, a symbol position where the PDCCH is mapped). According to the present embodiment, notification of the number of PDSCH repetition symbols becomes unnecessary.

Note that, since a base station and a terminal according to the present embodiment have the same basic configurations as base station 100 and terminal 200 according to Embodiment 1, they will be described with reference to FIGS. 4 and 5.

Base station 100 (e.g., controller 101) according to the present embodiment configures a symbol for terminal 200 to monitor the PDCCH (hereinafter, referred to as a "CORESET monitoring symbol" or also referred to as a "CORESET monitoring occasion"). The CORESET monitoring symbol may be notified to terminal 200 by, for example, the higher layer signaling, or may be defined as a default value. For example, base station 100 may configure a plurality of CORESET monitoring symbols within a slot.

In addition, when performing PDSCH repetition, base station 100 (e.g., controller 101) may allocate PDSCHs to resources arranged across the CORESET monitoring symbol. However, base station 100 does not allocate the PDSCHs to the CORESET monitoring symbol.

Further, in the present embodiment, PDSCH repetition is switched at the symbol next to the CORESET monitoring symbol. For example, in the PDSCH repetition, the RV may be shifted at the next symbol to the CORESET monitoring symbol.

Terminal 200 (for example, signal separator 202 and DCI receiver 203) detects a PDCCH (DCI) addressed to terminal 200, for example, at a specified CORESET monitoring symbol.

In addition, based on the specified CORESET monitoring symbol, terminal 200 (e.g., signal combiner 206) identifies time resources (e.g., the number of repetition symbols) for each PDSCH in the PDSCH repetition.

Operation examples 5 to 8 of base station 100 and terminal 200 according to the present embodiment will be described below.

Figure 12:
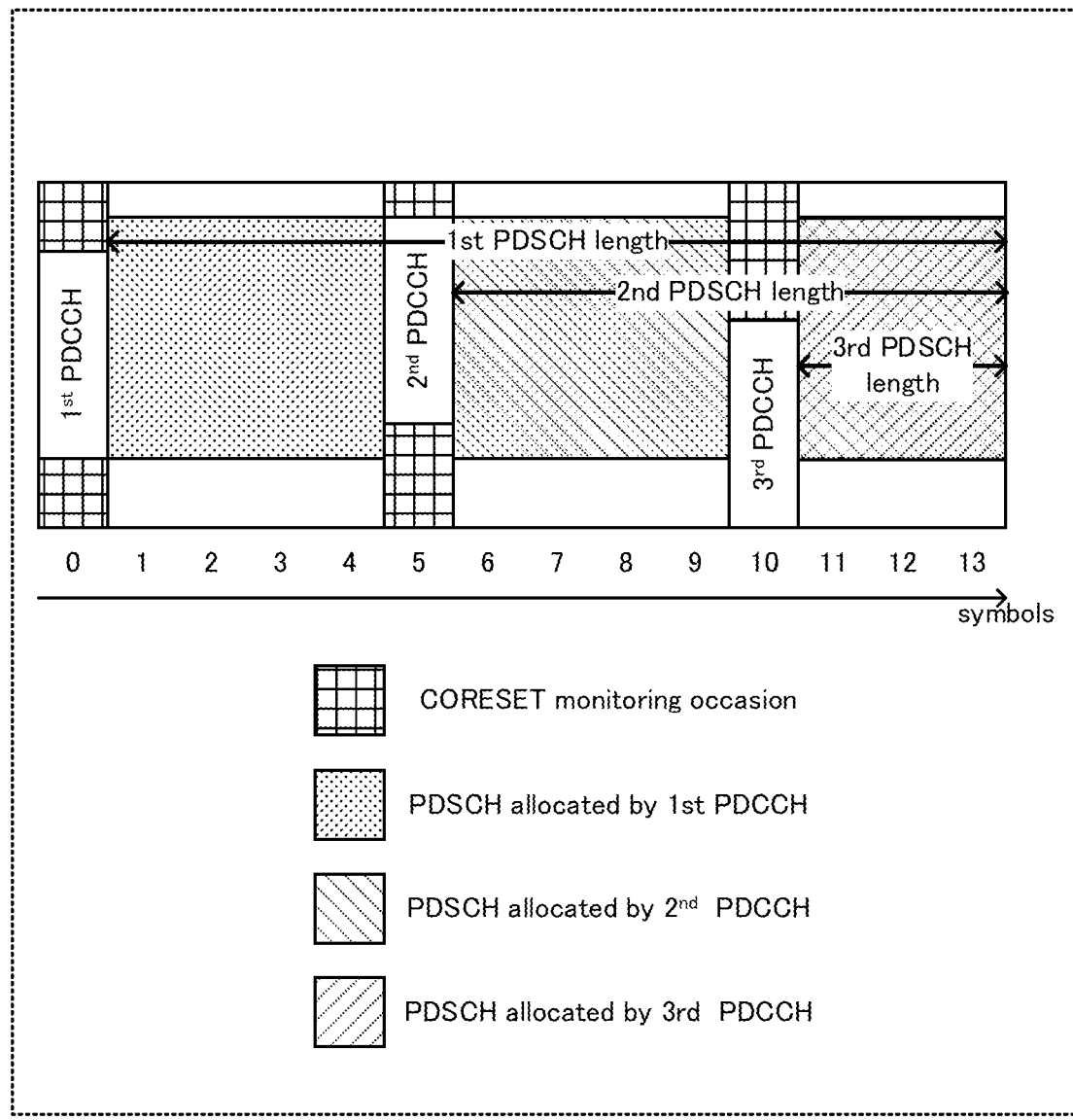
FIG. 12 illustrates an example of PDSCH allocation according to operation example 5.

[Operation Example 5]
FIG. 12 illustrates an example of PDSCH allocation according to operation example 5.

In FIG. 12, CORESET monitoring symbols are configured to symbols #0, #5, and #10. Terminal 200 detects a PDCCH addressed to terminal 200 in a search space of each CORESET configured to symbols #0, #5, or #10.

Further, in FIG. 12, by way of example, the cycle of the RV is set to [RV0, RV3, RV0, RV3].

Further, in FIG. 12, base station 100 and terminal 200 configure the number of repetition symbols (for example, fixed length X) to 4 symbols, which is the number of symbols between adjacent CORESET monitoring symbols. Further, in operation example 5, the number of symbols for calculating the TBS is 4 symbols as in Embodiment 1, which is the number of PDSCH repetition symbols (for example, the number of symbols between the adjacent CORESET monitoring symbols).

In FIG. 12, the first PDCCH allocates the symbol length=13 from symbol #1 and specifies RV0. Further, in FIG. 12, the second PDCCH allocates the symbol length=8 from symbol #6 and specifies RV3. Further, in FIG. 12, the third PDCCH allocates the symbol length=3 from symbol #11 and specifies RV0.

In addition, in operation example 5 as in operation example 2, base station 100 notifies terminal 200 of, for example, the same frequency resources, the same HARQ process number, a non-toggled New Data Indicator (NDI), and the same MCS using each of the PDCCHs. In addition, using each of the PDCCHs, base station 100 notifies terminal 200 of, for example, the symbol next to a symbol at which the PDCCH is mapped (e.g., CORESET monitoring symbol) as the PDSCH start symbol position.

For example, based on the resource information for these PDSCHs notified by the plurality of PDCCHs, terminal 200 judges whether or not repetition is configured for the PDSCHs allocated by the plurality of PDCCHs.

For example, in FIG. 12, when the first PDCCH is successfully detected, terminal 200 determines that the RV of the PDSCH is switched after the boundary CORESET monitoring symbol (in other words, at the symbol next to the CORESET monitoring symbol), and shifts the RV in the order of RV #0, RV #3, RV #0. In addition, for example, in FIG. 12, when the second and the third PDCCHs are further detected successfully, terminal 200 is notified of the same frequency and the same HARQ process by the three PDCCHs. Thus, terminal 200 is capable of determining that the repetition is configured for the PDSCHs allocated by the three PDCCHs.

Further, for example, in FIG. 12, when terminal 200 fails to detect the first PDCCH and successfully detects the second PDCCH, terminal 200 recognizes that the second PDCCH is the first received PDCCH. Accordingly, terminal 200 receives the PDSCH, assuming that PDSCH repetition starts at the start symbol position (symbol #6) of the PDSCH specified by the second PDCCH illustrated in FIG. 12. In addition, since RV #3 is specified by the second PDCCH, terminal 200 shifts the RV of the PDSCH in the order from RV #3 to RV #0. Further, for example, in FIG. 12, when the third PDCCH is also successfully detected, terminal 200 is notified of the same frequency and the same HARQ process by the two PDCCHs. Thus, terminal 200 is capable of determining that the repetition is configured for the PDSCHs allocated by the two PDCCHs.

Further, for example, in FIG. 12, when terminal 200 fails to detect the first and the second PDCCHs and successfully detects the third PDCCH, the third PDCCH is recognized to be the first received PDCCH. Accordingly, terminal 200 receives the PDSCH, assuming that PDSCH repetition starts at the start symbol position (symbol #11) of the PDSCH specified by the third PDCCH illustrated in FIG. 12.

Note that, the third PDSCH illustrated in FIG. 12 has a symbol length of 3, but base station 100 may calculate the TBS, assuming the PDSCH symbol length as 4 symbols, which is the numbers of symbols between the adjacent CORESET monitoring symbols.

As is understood, in operation example 5, it becomes unnecessary to signal a parameter (for example, the number of repetition symbols) for specifying the start positions of respective PDSCHs (in other words, RVs) in the PDSCH repetition.

In addition, even when detection of front PDCCHs of the plurality of PDCCHs is failed, when detection of the rear PDCCHs is succeeded, terminal 200 is capable of receiving the rear PDSCHs corresponding to the detected rear PDCCHs. In other words, in operation example 5, terminal 200 can perform the same operation as Option 3 illustrated in FIG. 1 or operation example 2 in Embodiment 1.

[Operation Example 6]

Figure 13:
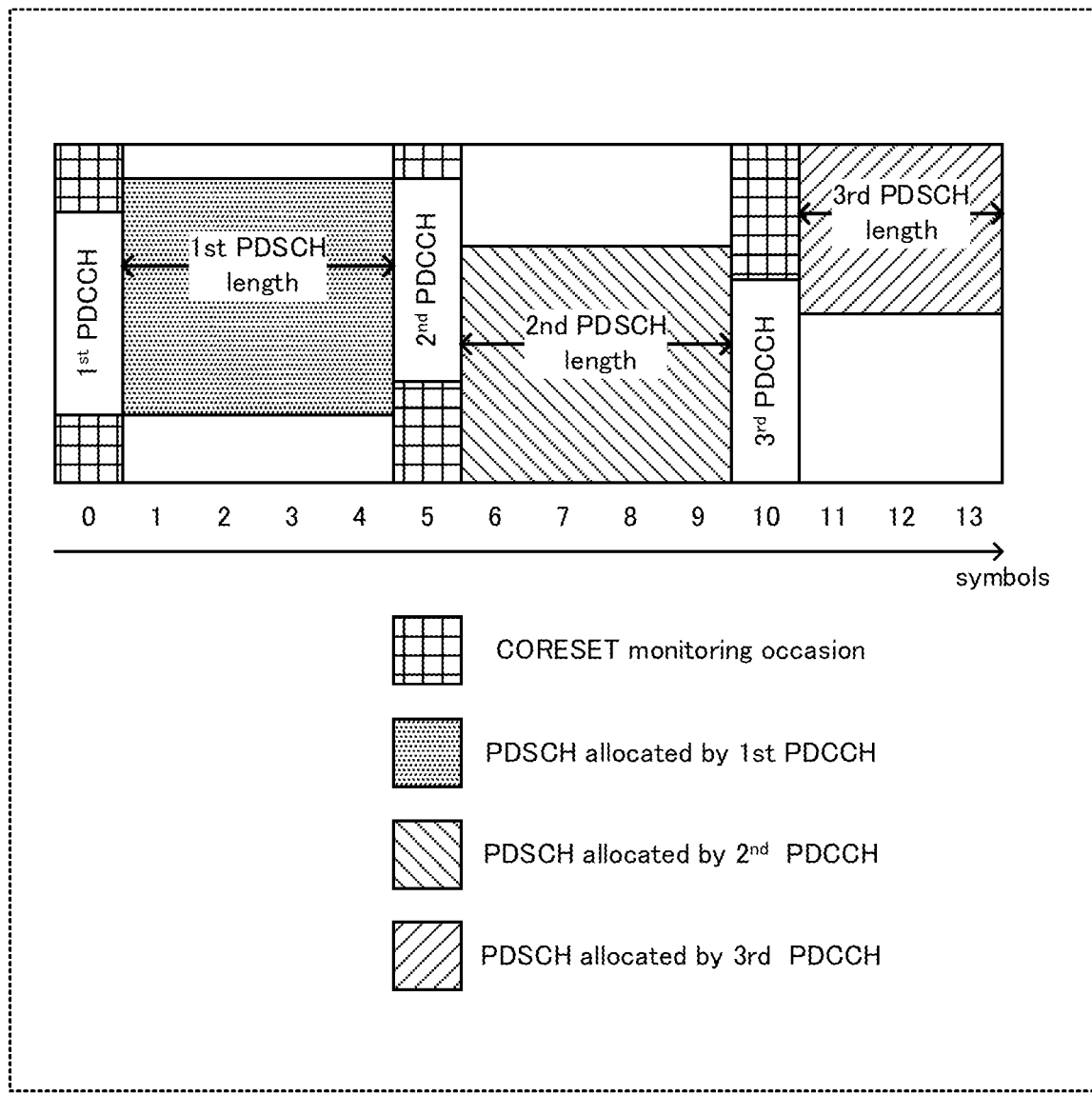
FIG. 13 illustrates an example of PDSCH allocation according to operation example 6.

FIG. 13 illustrates an example of PDSCH allocation according to operation example 6.

In operation example 6, as illustrated in FIG. 13, base station 100 notifies of the PDSCH repetition by using a plurality of PDCCHs as in operation example 5.

Further, in FIG. 13, CORESET monitoring symbols are configured to symbols #0, #5, and #10. Terminal 200 detects PDCCHs addressed to terminal 200 in search spaces of respective CORESETs configured to symbols #0, #5, and #10.

Further, in FIG. 13, base station 100 and terminal 200 configure the number of repetition symbols (for example, fixed length X) to 4 symbols, which is the number of symbols between adjacent CORESET monitoring symbols. Further, in operation example 6, the number of symbols for calculating the TBS is 4 symbols as in Embodiment 1, which is the number of PDSCH repetition symbols (for example, the number of symbols between the adjacent CORESET monitoring symbols).

In operation example 6, base station 100 notifies terminal 200 of, for example, the same HARQ process number, and a non-toggled New Data Indicator (NDI) using each of the PDCCHs. Base station 100 also notifies terminal 200 of, for example, different frequency resources in the respective PDCCHs. Base station 100 also notifies terminal 200 of different time resources (in other words, non-overlapping time resources) in the respective PDCCHs.

As is understood, in operation example 6, base station 100 allocates different resources for PDSCHs respectively by the plurality of PDCCHs as in operation example 3 of Embodiment 1. For example, as illustrated in FIG. 13, the first PDCCH allocates the symbol length=4 from symbol #1. Further, as illustrated in FIG. 13, the second PDCCH allocates the symbol length=4 from symbol #6. The third PDCCH allocates the symbol length=3 from symbol #11. In other words, base station 100 generates a DL data signal in units of 4 symbols that is the number of repetition symbols, and performs repetitive transmission of a PDSCH including one signal in units of 4 symbols by each of the PDCCHs.

When each of the PDCCHs is successfully detected, terminal 200 receives each PDSCH based on the notification in the detected PDCCH. Further, for example, in FIG. 13, when a plurality of PDCCHs are successfully detected, terminal 200 is notified of the same HARQ process by the plurality of PDCCHs. Thus, terminal 200 is capable of determining that the repetition is configured for the PDSCHs allocated by the plurality of PDCCHs.

As described above, in operation example 6, for example, as illustrated in FIG. 13, the PDSCH resources can be allocated by the plurality of PDCCHs without overlap between the PDSCH resources. Thus, base station 100 may freely notify the RV per PDCCH. Further, in operation example 6, terminal 200 can receive the PDSCH corresponding to the successfully detected PDCCH. In other words, in operation example 6, terminal 200 can perform the same operation as Option 2 illustrated in FIG. 1 or operation example 3 in Embodiment 1.

Note that, in operation example 6 as in operation example 3, even when the number of PDSCH symbols is less than 4 symbols that is the number of repetition symbols (in other words, the number of symbols between the CORESET monitoring symbols), the number of symbols used for calculating the TBS may be 4 symbols in order to make the TBSs the same between the PDSCHs allocated by the respective PDCCHs.

In addition, in operation example 6, frequency resources for PDSCH allocated by each of the plurality of PDCCHs can be arranged at different positions, but in order to apply the same TBSs, it is preferable that the same number of frequency resources and the same MCS be configured for each PDSCH. However, base station 100 may adjust the numbers of allocated frequency resources and the MCS such that the TBS is the same between the PDSCHs.

[Operation Example 7]

Figure 14:
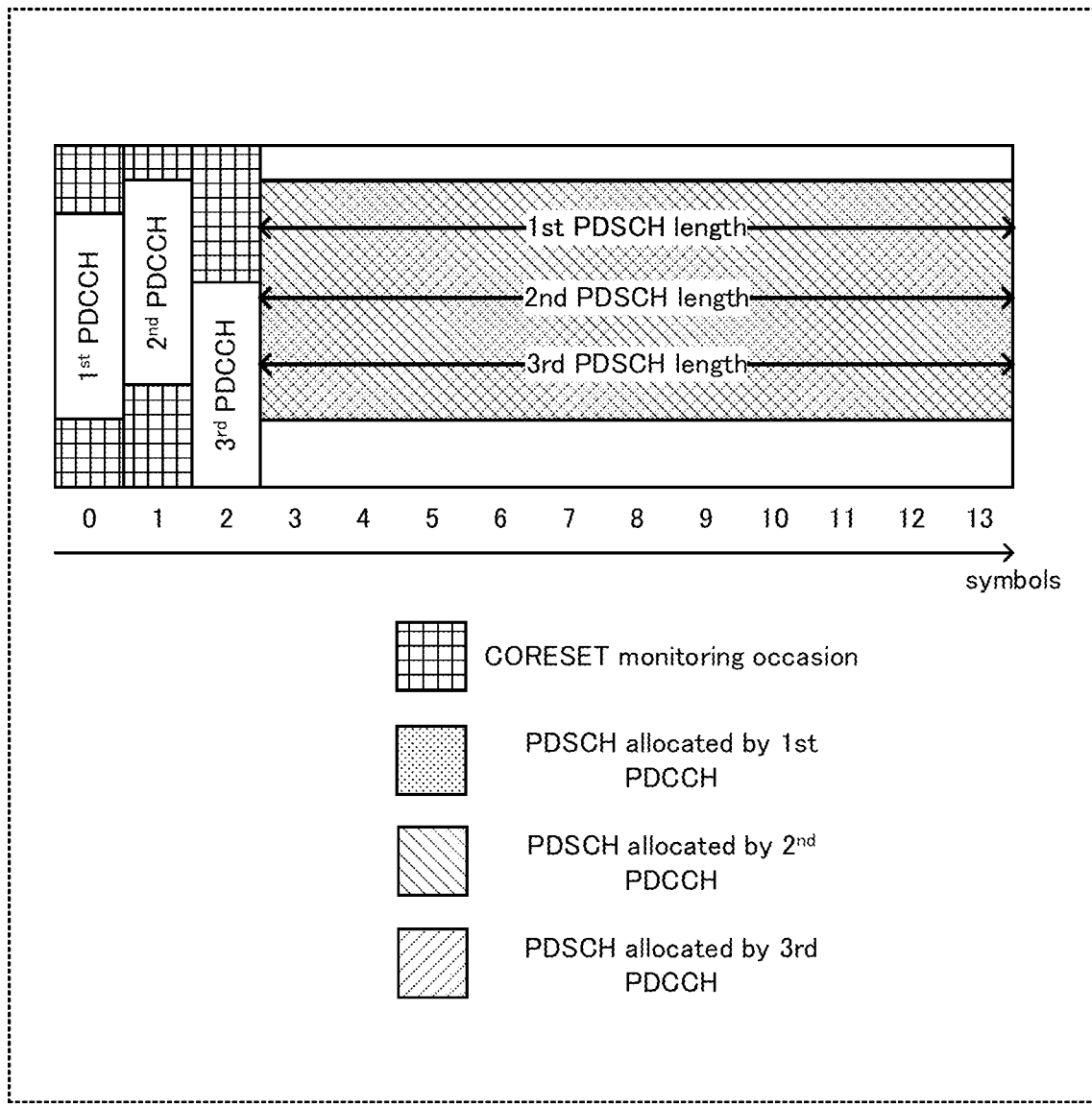
FIG. 14 illustrates an example of PDSCH allocation according to operation example 7.

FIG. 14 illustrates an example of PDSCH allocation according to operation example 7.

In operation example 7, as illustrated in FIG. 14, base station 100 notifies of PDSCH repetition by using a plurality of PDCCHs as in operation example 5.

In FIG. 14, CORESET monitoring symbols are configured to symbols #0, #1, and #2, which are the front part of the slot. Terminal 200 detects PDCCHs addressed to terminal 200 in search spaces of respective CORESET configured to symbols #0, #1, and #2.

In FIG. 14, PDSCHs are not divided by the CORESET monitoring symbols.

Correspondingly, the number of symbols for calculating the TBS (in other words, the number of PDSCH repetition symbols) is 11 symbols which is the number of symbols to be allocated by the PDCCHs.

In operation example 7, when repetition is applied, base station 100 notifies, using each PDCCH, terminal 200 of the PDCCH including the same DCI contents (e.g., frequency resource, time resource, HARQ process number, and non-toggled NDI).

As is understood, in operation example 7, base station 100 notifies of the PDSCH resources of the same content between all the PDCCHs. In operation example 7, for example, in FIG. 14, terminal 200 is capable of receiving all the PDSCHs assigned for terminal 200 when terminal 200 successfully detects at least one PDCCH of the three PDCCHs. In other words, in operation example 7, terminal 200 can perform the same operation as Option 1 illustrated in FIG. 1 or operation example 4 in Embodiment 1.

[Operation Example 8]

Above-described operation examples 1 to 7 have been described in relation to the example in which all the symbols within the slot are symbols configured for DL (hereinafter, referred to as "DL symbols").

Here, slot formats that can be specified by a Slot Format Indicator (SFI) of NR include a format in which the DL symbol and a symbol configured for UL (hereinafter, referred to as "UL symbol") are mixed within a slot.

Operation example 8 will be described in relation to the operation of base station 100 and terminal 200 with the slot format in which the DL symbol and the UL symbol are mixed.

Figure 15:
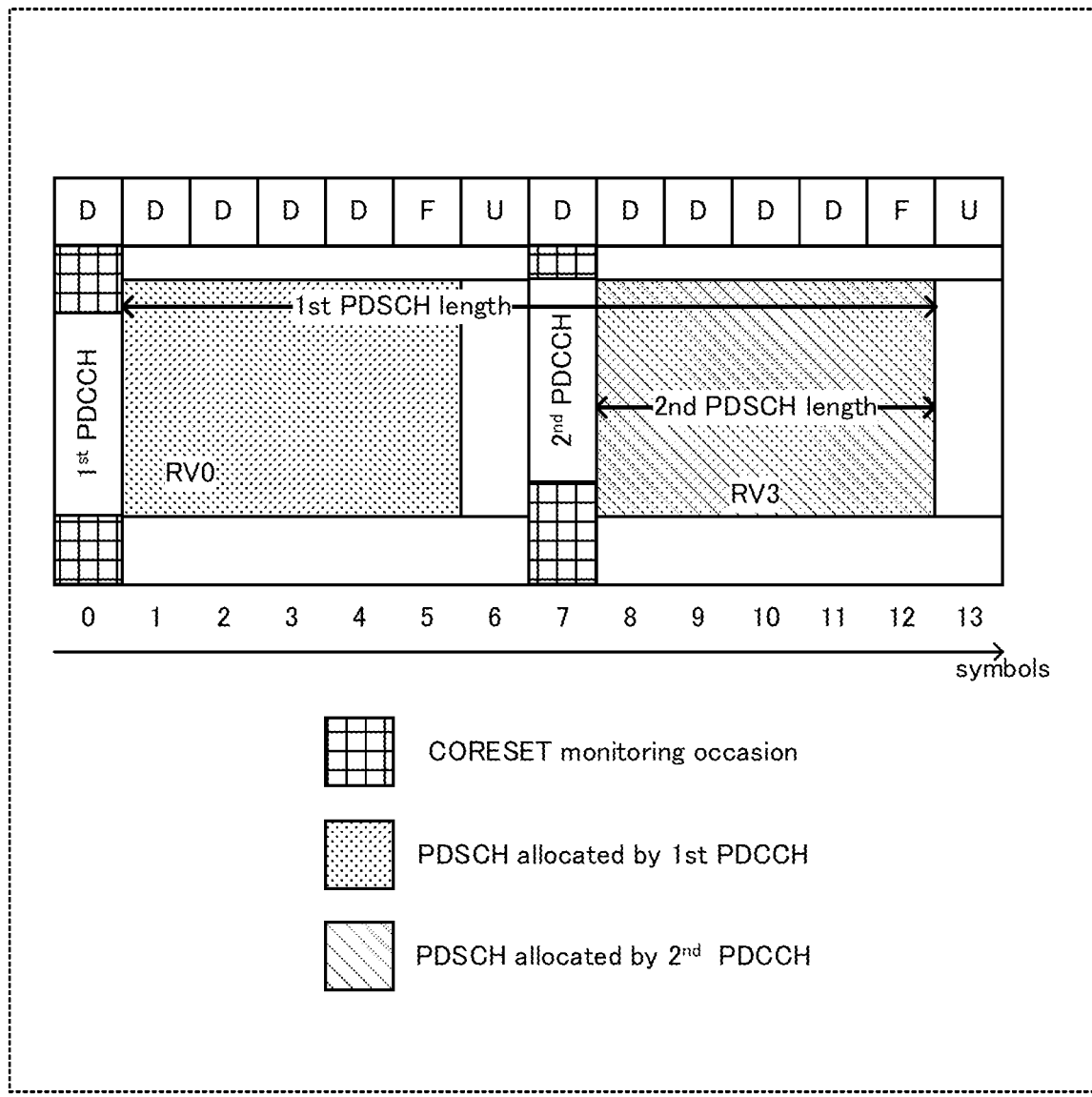
FIG. 15 illustrates an example of PDSCH allocation according to operation example 8.

FIG. 15 illustrates an example of PDSCH allocation according to operation example 8.

In FIG. 15, by way of example, the configuration of 14 symbols in a slot configured by a slot format is [D, D, D, D, F, U, D, D, D, D, F, U]. Here, "D" denotes the DL symbol, "U" denotes the UL symbol, and "F" denotes a Flexible symbol. The flexible symbol can be used for both the DL and UL symbols. The flexible symbol can also be used as a symbol for which resource allocation is not performed (for example, such a symbol may be referred to as "blank symbol" or "Unknown symbol").

In addition, in FIG. 15, CORESET monitoring symbols are configured to DL symbols #0 and DL symbol #7.

In operation example 8, when repetition is applied, base station 100 specify, with the first PDCCH, symbols including a UL symbol (symbol #6) for the PDSCH symbol length (12 symbols in FIG. 15). When the symbols specified as the PDSCHs include a UL symbol, terminal 200 recognizes that the PDSCHs are mapped to symbols other than the UL symbol (and CORESET monitoring symbol).

For example, in FIG. 15, when the first PDCCH is successfully detected, terminal 200 determines that, of 12 symbols (symbol #1 to #12) from symbol #1 that is the start symbol position, 10 symbols except for UL symbol #6 and DL symbol #7 that is the CORESET monitoring symbol are assigned for the PDSCHs.

Further, in FIG. 15, the number of symbols for calculating the TBS is 5 symbols calculated by excluding one symbol that is the number of UL symbols from 6 symbols that is the number of symbols between the adjacent CORESET monitoring symbols. Further, in FIG. 15, also when terminal 200 fails to detect the first PDCCH and successfully detects the second PDCCH, the number of symbols used for calculation of the TBS is 5.

Thus, in operation example 8, even when the slot format includes the UL symbol within the slot, base station 100 is capable of notifying terminal 200 of the PDSCH repetition.

Note that, the description with reference to FIG. 15 has been given in which, among the time resources (for example, DL resources) allocated by the PDCCHs, symbols other than the UL symbols (and the CORESET monitoring symbols) are allocated for the PDSCHs. However, for example, when the flexible symbols (F symbols) are used for an application (e.g., UL symbol) different from the DL symbol, symbols except for the UL symbols and the F symbols (and the CORESET monitoring symbols) among the time resources allocated by the PDCCHs are allocated for the PDSCHs.

Operation examples 5 to 8 have been described above.

For example, without additional content to the DCI contents notified by the PDCCHs, base station 100 is capable of flexibly switching between operation examples 5 to 8 depending on the resources for PDSCHs to be allocated by the PDCCHs (e.g., the start position, and/or the symbol length) and the number of PDCCHs to be transmitted.

In other words, base station 100 can operate any of operation examples 5 to 8 (for example, the same operations as Options 1 to 3 in FIG. 1) while switching between the operation examples based on the notification of the same HARQ process number (and a non-toggled NDI) and additionally based on the configuration in resource allocation information (in other words, the DCI contents notified by each of the PDCCHs). That is, base station 100 is capable of controlling the repetition based on association between the PDCCH repetition (e.g., any of Options 1 to 3 in FIG. 1) and PDSCH allocation.

For example, base station 100 may select any operation of operation examples 5 to 8 in consideration of the quality between base station 100 and terminal 200, the amount of resources allocated for other terminals 200, other signals to be transmitted, or the like.

As is understood, in the present embodiment as in Embodiment 1, since PDSCH repetition is performed in units of the repetition symbols, base station 100 is capable of switching between the PDSCH repetition methods by the same signaling to terminal 200 (in other words, without adding signaling) as described above.

Thus, base station 100 is capable of, for example, configuring the PDSCH repetition suitable for terminal 200 and transmitting the PDSCHs. Therefore, according to the present embodiment, it is possible to enhance the PDSCH reception performance.

Further, in the present embodiment, the number of PDSCH repetition symbols is calculated based on the number of CORESET monitoring symbols. Therefore, in the present embodiment, signaling for notifying the number of PDSCH repetition symbols becomes unnecessary.

Embodiment 3

In HRLLC of LTE corresponding to URLLC of NR, when PDCCH and PDSCH repetitions are performed, the transmission timing of transmitting HARQ-ACK in response to a PDSCH is determined based on, for example, the timing of the last PDSCH of the repetitive PDSCHs.

However, when a plurality of PDCCHs and a plurality of PDSCHs are associated respectively with each other in an independent one-to-one relationship as in Option 2 illustrated in FIG. 1, the UE cannot identify the position (in other words, the timing) of the last PDSCH if the UE fails to detect the last PDCCH. Accordingly, the UE cannot identify the transmission timing of transmitting HARQ-ACK and cannot transmit HARQ-ACK.

The present embodiment will be described in relation to a method of configuring a transmission region for transmission of HARQ-ACK in response to a PDSCH in a case where PDCCH repetition is performed and PDSCHs are notified to a UE by a plurality of PDCCHs.

Since a base station and a terminal according to the present embodiment have the same basic configurations as base station 100 and terminal 200 according to Embodiment 1, they will be described with reference to FIGS. 4 and 5.

For example, the present embodiment will be described in relation to operation example 9 in which the transmission region for one HARQ-ACK is indicated by a plurality of PDCCHs, and operation example 10 in which a plurality of PDCCHs indicate individual transmission regions for HARQ-ACK. According to these operation examples, when at least one PDCCH of PDCCH repetitions is successfully detected, terminal 200 is capable of transmitting HARQ-ACK even when failing to detect the other PDCCHs.

DCI generator 103 of base station 100 according to the present embodiment generates, for example, a parameter relevant to resources used for HARQ-ACK transmission (e.g., frequency resources, start symbol position, number of symbols, and the like) and a parameter relevant to a HARQ-ACK transmission timing (e.g., slot) based on the HARQ-ACK resource information inputted from HARQ-ACK resource determiner 102.

The parameter relevant to the resources used for the HARQ-ACK transmission is, for example, "PDCCH resource indicator." Further, the parameter relevant to the HARQ-ACK transmission timing is, for example, "PDSCH-to-HARQ_feedback timing indicator."

Note that, when incapable of indicating the specified HARQ-ACK resource, DCI generator 103 may generate a bit field that indicates to terminal 200 that HARQ-ACK is not to be transmitted.

HARQ-ACK receiver 110 of base station 100 combines HARQ-ACK for the same DL data signal when repetition of HARQ-ACKs is also performed for the repetitive PDSCHs.

HARQ-ACK receiver 110 judges ACK, NACK, or DTX for the DL data signals using the combined HARQ-ACK, and reports a judgement result to a MAC-layer processor (not illustrated).

Meanwhile, HARQ-ACK resource determiner 209 of terminal 200 according to the present embodiment determines a resource for transmitting HARQ-ACK based on the HARQ-ACK resource information inputted from DCI receiver 203, and outputs the resource to signal allocator 212. Note that, in a case where there is a specification of an allocation order between the HARQ-ACK resource and the PDSCHs (an example of such a case is described later as operation example 10), and when the allocation order differs from that in the specification, HARQ-ACK resource determiner 209 determines that the DCI has been erroneously detected and stops receiving the PDSCHs and transmitting the HARQ-ACK.

Next, by way of example, operation example 9 in which the transmission region for one HARQ-ACK is indicated by a plurality of PDCCHs, and operation example 10 in which a plurality of PDCCHs respectively indicate the individual transmission regions for HARQ-ACK will be described.

[Operation Example 9]

In operation example 9, the same HARQ-ACK transmission region is notified by a plurality of repetitive PDCCHs.

In NR, the "PUCCH resource indicator" included in the DCI allocating the PDSCHs indicates the frequency resource, symbol number, and the number of symbols of an uplink control channel (e.g., Physical Uplink Control Channel (PUCCH)) for transmitting HARQ-ACK. For example, when terminal 200 is notified of candidates for the HARQ-ACK resource (e.g., combinations of the frequency resource, symbol number, and the number of symbols) by the higher layer signaling, base station 100 may select one combination (in other words, pattern) by signaling of the DCI, "PUCCH resource indicator."

In NR, the "PDSCH-to-HARQ_feedback timing indicator" included in the DCI for allocating PDSCHs indicates how many slots there are before transmission of HARQ-ACK after the slot to which the PDSCHs are allocated.

In operation example 9, in a plurality of repetitive PDCCHs, the "PUCCH resource indicators" indicate the same value to terminal 200, for example. Meanwhile, in a plurality of repetitive PDCCHs, the "PDSCH-to-HARQ_feedback timing indicators" may indicate different values, for example, to indicate the same slot. For example, for the "PDSCH-to-HARQ_feedback timing indicator" in each of the PDCCHs, a value corresponding to a timing difference (for example, referred to as "HARQ timing") between the reception timing of a PDSCH allocated by the PDCCH and the HARQ-ACK transmission timing.

Figure 16:
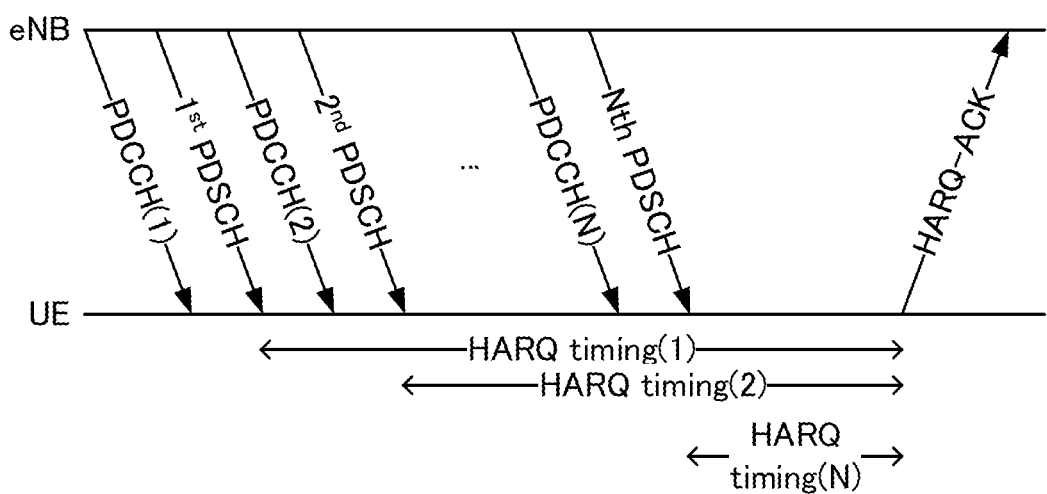
FIG. 16 illustrates an example of HARQ-ACK transmission according to operation example 9.

FIG. 16 illustrates an example of HARQ-ACK transmission according to operation example 9. As illustrated in FIG. 16, terminal 200 (UE) is notified of the same HARQ-ACK transmission region by a plurality of PDCCH repetitions.

For example, in FIG. 16, the "PUCCH resource indicators" included in number N of PDCCHs include information indicating the same HARQ-ACK resource.

Further, in FIG. 16, "PDSCH-to-HARQ_feedback timing indicator" included in the first PDCCH (1) includes a value corresponding to HARQ timing (1) representing the difference between the reception timing of the first PDSCH allocated by PDCCH (1) and the transmission timing of HARQ-ACK. Similarly, in FIG. 16, "PDSCH-to-HARQ_feedback timing indicator" included in the Nth PDCCH (N) includes a value corresponding to HARQ timing (N) representing the difference between the reception timing of the Nth PDSCH allocated by PDCCH (N) and the transmission timing of HARQ-ACK.

As is understood, the "PDSCH-to-HARQ_feedback timing indicators" included respectively in N PDCCHs illustrated in FIG. 16 include respective different values corresponding to the HARQ timings that are the differences between the reception timings of the PDSCHs allocated by the PDCCHs and the transmission timings of HARQ-ACK. In other words, the "PDSCH-to-HARQ_feedback timing indicator" included in each of the PDCCHs indicates the same HARQ-ACK transmission timing.

As is understood, specifying a single HARQ-ACK transmission region for PDCCH repetitions makes it possible to reduce the number of HARQ-ACK transmissions to reduce the power consumed by terminal 200.

Here, as illustrated in FIG. 16, when the PDCCH repetition is applied, and when it is specified that the same region is notified as the HARQ-ACK transmission region, terminal 200 is capable of judging that, when a different HARQ-ACK transmission region (for example, different transmission timing) is indicated by a PDCCH, the PDCCH has been erroneously detected. For example, URLLC requires reduction of the probability of erroneous operation caused by erroneous detection of a PDCCH. According to operation example 9, since the number of elements allowing judgement of erroneous detection of a PDCCH increases, it is possible to reduce the probability of erroneous operation caused by erroneous detection of the PDCCH.

In addition, in Rel-15 NR, the HARQ-ACK transmission timing indicated by the "PDSCH-to-HARQ_feedback timing indicator" is on a slot-by-slot basis.

On the other hand, in Rel-16 NR URLLC, it has been considered to reduce the latency of HARQ-ACK transmission by configuring a plurality of HARQ-ACK transmission timings within one slot. When a plurality of transmission timings for HARQ-ACK are configured within a slot, it is possible to configure the timings more finely than in Rel-15 NR. However, the number of timings that can be notified using the same number of bits is limited, and indicating the same timing of HARQ-ACK transmissions by a plurality of PDCCHs may be difficult.

Therefore, in operation example 9, when the PDCCH repetition is performed, base station 100 may configure terminal 200 with an indication that HARQ-ACK is not to be transmitted in some of a plurality of PDCCHs.

For example, even when the indication that HARQ-ACK is not to be transmitted is configured in one of a plurality of repetitive PDCCHs, indication of the HARQ-ACK transmission timing by the other PDCCHs allows terminal 200 to transmit HARQ-ACK for the PDSCHs allocated by the plurality of repetitive PDCCHs.

On the assumption that terminal 200 detects a plurality of PDCCHs, and when base station 100 cannot indicate the HARQ-ACK timing in all of the PDCCHs, base station 100 can indicate, to terminal 200 and in some of the PDCCHs, that HARQ-ACK is not to be transmitted. For example, the time between reception of a PDCCH by terminal 200 and HARQ-ACK transmission is longer for the front PDCCH (e.g., PDCCH (1) or the like in FIG. 16) among the times for the plurality of repetitive PDCCHs. Thus, the indication that HARQ-ACK is not to be transmitted is effective for a case where a rear HARQ-ACK timing cannot be notified by signaling included in the DCI in a front PDCCH.

For example, the indication that HARQ-ACK is not to be transmitted may be notified in the bit field of "PUCCH resource indicator" or "PDSCH-to-HARQ_feedback timing indicator."

When the indication that HARQ-ACK is not to be transmitted is notified in the bit field of "PUCCH resource indicator" in a certain PDCCH, notification of the "PDSCH-to-HARQ_feedback timing indicator" included in the PDCCH is disabled. Thus, in this case, terminal 200 may ignore the bit of the "PDSCH-to-HARQ_feedback timing indicator."

In addition, when the indication that HARQ-ACK is not to be transmitted is notified in the bit field of "PDSCH-to-HARQ_feedback timing indicator" in a certain PDCCH, terminal 200 may ignore the bit of "PUCCH resource indicator" included in the PDCCH.

Alternatively, a predetermined bit field (e.g., all zeros) may be configured in the signaling, "PUCCH resource indicator" or "PDSCH-to-HARQ_feedback timing indicator" to be disabled. For example, configuring the "PUCCH resource indicator" or "PDSCH-to-HARQ_feedback timing indicator" as the predetermined bit field allows terminal 200 to judge erroneous detection of the DCI when the value of the bit field differs from the predetermined value. Therefore, since the number of elements allowing judgement of erroneous detection of a PDCCH increases, it is possible to reduce the probability of erroneous operation caused by erroneous detection of the PDCCH.

Note that, in operation example 9, HARQ-ACK repetition may be configured separately. For example, each of the PDCCHs notifies of the same HARQ-ACK transmission region. At this time, the number of HARQ-ACK repetitions may be specified and HARQ-ACK repetitions may be performed.

[Operation Example 10]

In operation example 10, different HARQ-ACK transmission regions are notified respectively by a plurality of repetitive PDCCHs. According to operation example 10, HARQ-ACK repetition is also performed.

When a plurality of HARQ-ACK transmission regions are configured, the HARQ-ACK reception quality can be improved. In addition, for example, configuring a transmission beam for each HARQ-ACK offers a transmission diversity effect or an effect that HARQ-ACK can be easily received by a plurality of Transmission Reception Points (TRPs).

In operation example 10, the following three options are possible regarding the relation between the order of PDSCHs and the order of HARQ-ACK transmissions.

Figure 17:
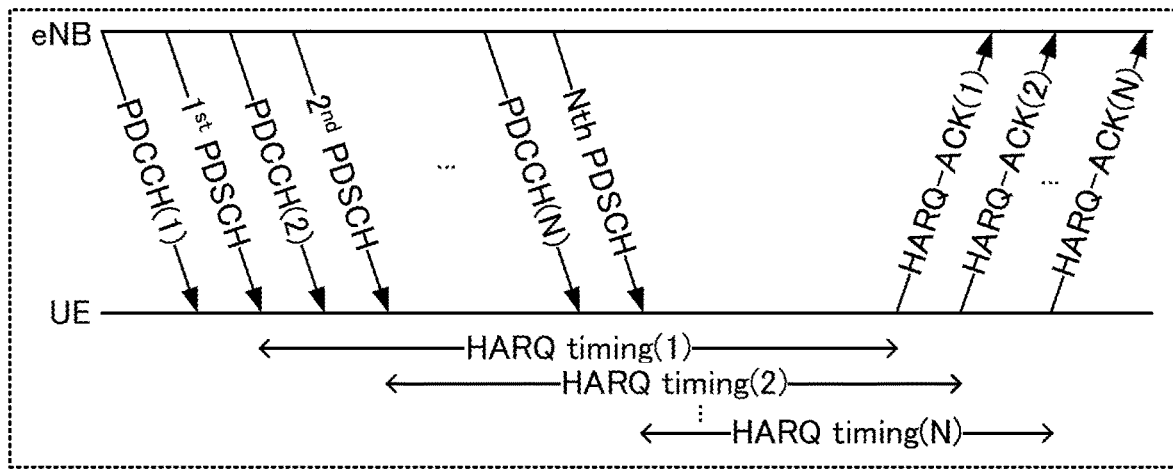
FIG. 17 illustrates an example of HARQ-ACK transmission according to operation example 10.

In Options 10-1 (see, e.g., FIG. 17), the order of PDSCHs indicated by PDCCHs corresponds to the order of HARQ-ACK transmissions indicated by the PDCCHs. For example, in FIG. 17, the order of the PDSCHs indicated by the first PDCCH (1) to the Nth PDCCH (N) is the same as the order of transmissions of HARQ-ACK (1) to HARQ-ACK (N) for the respective PDSCHs.

With this configuration, for example, a method called "early feedback" can be supported in which HARQ-ACK is transmitted by terminal 200 without waiting for all the PDSCHs to be received. For example, terminal 200 calculates by which timing PDSCHs are to be received in order for a decoding process of the PDSCHs to be completed in time with reference to a starting point of the HARQ-ACK transmission timing indicated by a PDCCH. Then, terminal 200 may combine the PDSCH repetitions within a range where the decoding process of the PDSCHs can be completed in time, and may transmit HARQ-ACK for the combined PDSCH.

Note that, the number of preceding symbols for which terminal 200 can combine the PDSCHs depends on, for example, a subcarrier spacing. For example, base station 100 and terminal 200 may share an awareness as to the number of preceding symbols for which the PDSCHs can be combined.

In a case where it is specified that the order of PDSCHs is to be the same as the order of HARQ-ACK transmissions as in operation example 10 and when a HARQ-ACK timing in a different order is indicated by a PDCCH, terminal 200 can determine that the PDCCH has been erroneously detected.

Figure 18:
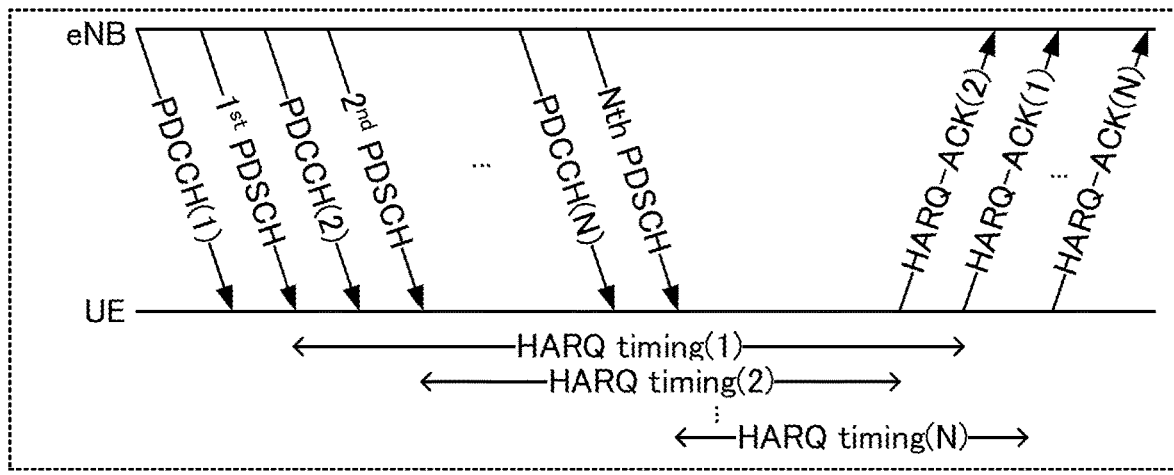
FIG. 18 illustrates an example of HARQ-ACK transmission according to operation example 10.

Option 10-2 (see, e.g., FIG. 18) specifies nothing about the order of PDSCHs indicated by PDCCHs and the order of HARQ-ACK transmissions indicated by the PDCCHs. According to Option 10-2, the flexibility in configuration of HARQ-ACK transmission timings is improved.

Figure 19:
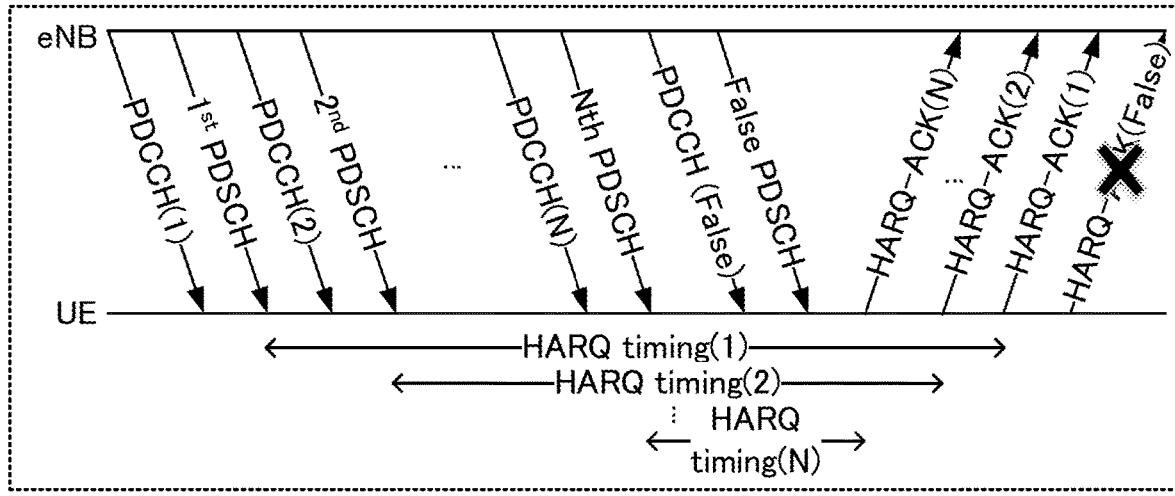
FIG. 19 illustrates an example of HARQ-ACK transmission according to operation example 10.

In Option 10-3 (see, e.g., FIG. 19), the order of PDSCHs indicated by PDCCHs and the order of HARQ-ACK transmissions indicated by the PDCCHs are reversed. For example, in FIG. 19, the order of PDSCHs indicated by the first PDCCH (1) through the Nth PDCCH (N) and the order of transmissions of HARQ-ACK (1) through HARQ-ACK (N) for the respective PDSCHs (e.g., N, N−1, . . . , 2, 1) are reversed.

Accordingly, for example, the limitation on the timings of HARQ-ACK transmissions is stricter in option 10-3 than in option 10-1. Therefore, it is possible to improve the probability that terminal 200 can determine erroneous detection of a PDCCH based on erroneous configuration of a HARQ-ACK transmission timing.

Note that, also in operation example 10, the same HARQ-ACK transmission region may be notified by a plurality of PDCCHs. For example, the number of HARQ-ACK repetitions can be adjusted by employing a configuration in which, among repetitions, some of the PDCCHs configure the same HARQ-ACK transmission region and the remaining PDCCHs configure a different HARQ-ACK transmission region.

Operation example 9 and operation example 10 have been described above.

As is understood, according to the present embodiment, one or more HARQ-ACK transmission regions are specified by a plurality of PDCCHs. Thus, terminal 200 can transmit HARQ-ACK by detecting at least one PDCCH among the plurality of PDCCHs.

Note that, in the present embodiment, the control signal for indicating HARQ-ACK resources to terminal 200 is not limited to the "PUCCH resource indicator" and "PDSCH-to-HARQ-feedback timing indicator," and may be another control signal.

The embodiments of the present disclosure have been described above.

OTHER EMBODIMENT

Note that, the above embodiments have been described in which the PDSCHs (e.g., DL data signals) are allocated by the PDCCHs. However, an exemplary embodiment of the present disclosure may be applied to a case where an uplink data channel (e.g., Physical Uplink Shared Channel (PUSCH)) for transmitting a UL data signal is allocated by a PDCCH. In addition, an exemplary embodiment of the present disclosure may also be applied to allocation of a data channel different from the PDSCH and the PUSCH.

Further, the above embodiments have been described in which the PDCCH is used as the downlink control channel for transmitting the control signal. However, the downlink control channel for transmitting the control signal may be a control channel of another name. For example, the downlink control channel for transmitting the control signal may be an Enhanced PDCCH (EPDCCH), a Relay PDCCH (R-PDCCH), a Machine Type Communication PDCCH (MPDCCH), or the like.

Further, the values or cycles of the RV described in the above embodiments are one examples. For example, the value or cycle of the RV such as [RV0, RV3, RV0, RV3 . . . ], [RV0, RV0, RV0, RV0], [RV0, RV2, RV3, RV1], or the like may be predetermined or may be configured for terminal 200 by the higher layer signaling.

In addition, in the above embodiments, terminal 200 may be configured, by the higher layer signaling (e.g., RRC signaling or MAC signaling), with whether or not the repetition is configured, or terminal 200 may also be notified, by a bit in the DCI, of whether or not the repetition is configured. When the configuration of repetition is notified by the higher layer signaling, the number of bits of the DCI can be reduced. Alternatively, when the configuration of repetition is notified by the DCI, it is possible to dynamically change whether or not to configure the repetition.

Further, in the above embodiments, the PDCCH may be transmitted from the same carrier as the PDSCH (which is refereed to as "self-scheduling," for example), or may be transmitted from a carrier other than the carrier transmitting the PDSCH (which is referred to as "cross-carrier scheduling," for example).

Further, in the above embodiments, PDSCH symbols are not limited to the symbols in a slot, but symbols spanning a plurality of slots may be specified. When PDSCH symbols spanning a plurality of slots are specified, both the number of slots to which PDSCHs are allocated and the number of symbols may be notified by a PDCCH.

In addition, the PDSCH repetition (intra-slot repetition) described in the above embodiments may be used in combination with slot-based PDSCH repetition. For example, the intra-slot repetition may be achieved based on an exemplary embodiment of the present disclosure, and the slot-based repetition may be separately notified to terminal 200 by a PDCCH, or may be configured by the higher layer.

Further, the RRC signaling is considered as the higher layer signaling in the above embodiments, but may be replaced with the MAC signaling or the notification by the DCI, which is the signaling of a physical layer. The MAC signaling and the physical layer signaling allow an increase in changing frequency in comparison to the RRC signaling.

In addition, in the above embodiments, URLLC is taken as an example of a data type (or application) requiring lower reliability, but the data type requiring lower reliability is not limited to URLLC.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by a single LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A base station according to an exemplary embodiment of the present disclosure includes: circuitry, which, in operation, generates a data signal in units of a fixed length; and a transmitter, which in operation, performs repetitive transmission of a transmission signal in a resource configurable to a plurality of data lengths, the transmission signal including at least one of a plurality of the data signals in units of the fixed length.

In an exemplary embodiment of the present disclosure, a transport block size of the data signal is calculated based on the fixed length.

In an exemplary embodiment of the present disclosure, the data signal in units of the fixed length is allocated by a plurality of control channel signals notified at different times, a first time resource allocated by a first control channel signal of the plurality of control channel signals overlaps with a portion of a second time resource allocated by a second control channel signal transmitted earlier than the first control channel signal in a time domain, and a start position of the first time resource is in rear of a start position of the second time resource by an integer multiple of the fixed length.

In an exemplary embodiment of the present disclosure, the fixed length is notified by higher layer signaling.

In an exemplary embodiment of the present disclosure, the fixed length is determined based on a symbol position at which a control channel is mapped.

In an exemplary embodiment of the present disclosure, a downlink time resource allocated in units of the fixed length is a resource among time resources allocated by a control channel signal, the resource being a resource except for an uplink time resource.

In an exemplary embodiment of the present disclosure, the circuitry resets a value of a redundancy version (RV) per unit of the fixed length.

A terminal according to an exemplary embodiment of the present disclosure includes: a receiver, which in operation, receives a transmission signal for which repetitive transmission is performed in a resource configurable to a plurality of data lengths, the transmission signal including at least one data signal in units of a fixed length; and circuitry, which, in operation, combines the transmission signal to obtain the at least one data signal.

A transmission method according to an exemplary embodiment of the present disclosure includes: generating a data signal in units of a fixed length; and performing repetitive transmission of a transmission signal in a resource configurable to a plurality of data lengths, the transmission signal including at least one of a plurality of the data signals in units of the fixed length.

A reception method according to an exemplary embodiment of the present disclosure includes: receiving a transmission signal for which repetitive transmission is performed in a resource configurable to a plurality of data lengths, the transmission signal including at least one data signal in units of a fixed length; and combining the transmission signal to obtain the at least one data signal.

The disclosure of Japanese Patent Application No. 2019-002051 dated Jan. 9, 2019 including the specification, drawings and abstract is incorporated herein by reference in its entirety.

INDUSTRIAL APPLICABILITY

An exemplary embodiment of the present disclosure is useful for mobile communication systems.

REFERENCE SIGNS LIST

100 Base station
101 Controller
102, 209 HARQ-ACK resource determiner
103 DCI generator
104, 210 Error correction encoder
105, 211 Modulator
106, 212 Signal allocator
107, 213 Transmitter
108, 201 Receiver
109, 202 Signal separator
110 HARQ-ACK receiver
111, 205 Demodulator
112 Error correction decoder
200 Terminal
203 DCI receiver
204 Higher-layer receiver
206 Signal combiner
207 Error correction decoder
208 Error judgement section

The invention claimed is:

1. A base station, comprising:
   circuitry, which, in operation, generates a data signal in units of a fixed length; and
   a transmitter, which in operation, performs repetitive transmission of a transmission signal in a resource configurable to a plurality of data lengths, the transmission signal including at least one of a plurality of the data signals in units of the fixed length, wherein
   the data signal in units of the fixed length is allocated by a plurality of control channel signals notified at different times,
   a first time resource allocated by a first control channel signal of the plurality of control channel signals overlaps with a portion of a second time resource allocated by a second control channel signal transmitted earlier than the first control channel signal in a time domain, and
   a start position of the first time resource is in rear of a start position of the second time resource by an integer multiple of the fixed length.

2. The base station according to claim 1, wherein
a transport block size of the data signal is calculated based on the fixed length.

3. The base station according to claim 1, wherein
the fixed length is notified by higher layer signaling.

4. The base station according to claim 1, wherein
the fixed length is determined based on a symbol position at which a control channel is mapped.

5. The base station according to claim 1, wherein
a downlink time resource allocated in units of the fixed length is a resource among time resources allocated by a control channel signal, the resource being a resource except for an uplink time resource.

6. The base station according to claim 1, wherein
the circuitry resets a value of a redundancy version (RV) per unit of the fixed length.

7. A terminal, comprising:
   a receiver, which in operation, receives a transmission signal for which repetitive transmission is performed in a resource configurable to a plurality of data lengths, the transmission signal including at least one data signal in units of a fixed length; and
   circuitry, which, in operation, combines the transmission signal to obtain the at least one data signal, wherein
   the data signal in units of the fixed length is allocated by a plurality of control channel signals notified at different times,
   a first time resource allocated by a first control channel signal of the plurality of control channel signals overlaps with a portion of a second time resource allocated by a second control channel signal transmitted earlier than the first control channel signal in a time domain, and a start position of the first time resource is in rear of a start position of the second time resource by an integer multiple of the fixed length.

8. A transmission method, comprising:

generating a data signal in units of a fixed length; and performing repetitive transmission of a transmission signal in a resource configurable to a plurality of data lengths, the transmission signal including at least one of a plurality of the data signals in units of the fixed length, wherein the data signal in units of the fixed length is allocated by a plurality of control channel signals notified at different times, a first time resource allocated by a first control channel signal of the plurality of control channel signals overlaps with a portion of a second time resource allocated by a second control channel signal transmitted earlier than the first control channel signal in a time domain, and a start position of the first time resource is in rear of a start position of the second time resource by an integer multiple of the fixed length.

9. A reception method, comprising:

receiving a transmission signal for which repetitive transmission is performed in a resource configurable to a plurality of data lengths, the transmission signal including at least one data signal in units of a fixed length; and combining the transmission signal to obtain the at least one data signal, wherein the data signal in units of the fixed length is allocated by a plurality of control channel signals notified at different times, a first time resource allocated by a first control channel signal of the plurality of control channel signals overlaps with a portion of a second time resource allocated by a second control channel signal transmitted earlier than the first control channel signal in a time domain, and a start position of the first time resource is in rear of a start position of the second time resource by an integer multiple of the fixed length.

\* \* \* \* \*